(12) United States Patent
Kumai et al.

(10) Patent No.: US 10,030,159 B2
(45) Date of Patent: Jul. 24, 2018

(54) ACTIVE-ENERGY-RAY-CURABLE COMPOSITION, ACTIVE-ENERGY-RAY-CURABLE INK, TWO-DIMENSIONAL OR THREE-DIMENSIONAL IMAGE FORMING METHOD, TWO-DIMENSIONAL OR THREE-DIMENSIONAL IMAGE FORMING APPARATUS, AND CURED MATERIAL

(71) Applicants: Mio Kumai, Tokyo (JP); Mihoko Matsumoto, Shizuoka (JP); Masayuki Koyano, Kanagawa (JP); Kaori Miyahara, Shizuoka (JP); Azumi Miyaake, Kanagawa (JP); Yuuki Mizutani, Kanagawa (JP); Ayano Momose, Tokyo (JP); Maiko Koeda, Shizuoka (JP); Yuri Haga, Tokyo (JP); Hiroki Nakane, Kanagawa (JP); Takayuki Shimizu, Kanagawa (JP); Hiroki Kobayashi, Kanagawa (JP)

(72) Inventors: Mio Kumai, Tokyo (JP); Mihoko Matsumoto, Shizuoka (JP); Masayuki Koyano, Kanagawa (JP); Kaori Miyahara, Shizuoka (JP); Azumi Miyaake, Kanagawa (JP); Yuuki Mizutani, Kanagawa (JP); Ayano Momose, Tokyo (JP); Maiko Koeda, Shizuoka (JP); Yuri Haga, Tokyo (JP); Hiroki Nakane, Kanagawa (JP); Takayuki Shimizu, Kanagawa (JP); Hiroki Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/454,403

(22) Filed: Mar. 9, 2017

(65) Prior Publication Data
US 2017/0260405 A1 Sep. 14, 2017

(30) Foreign Application Priority Data

Mar. 11, 2016 (JP) .................................. 2016-048918

(51) Int. Cl.
*C09D 11/101* (2014.01)
*C09D 11/38* (2014.01)
(Continued)

(52) U.S. Cl.
CPC ........... *C09D 11/101* (2013.01); *B41J 11/002* (2013.01); *C09D 11/106* (2013.01); *C09D 11/107* (2013.01); *C09D 11/38* (2013.01)

(58) Field of Classification Search
CPC .................................................. B29C 67/0059
See application file for complete search history.

(56) References Cited

U.S. PATENT DOCUMENTS

| 2004/0091643 A1* | 5/2004 | Nair ....................... G02B 1/105 |
| | | 428/1.33 |
| 2005/0148739 A1* | 7/2005 | Hara ................... C08F 283/006 |
| | | 525/452 |

(Continued)

FOREIGN PATENT DOCUMENTS

| EP | 2546311 A1 | 1/2013 |
| JP | 5265916 | 5/2013 |

(Continued)

*Primary Examiner* — Shelby Fidler
(74) *Attorney, Agent, or Firm* — Oblon, McClelland, Maier & Neustadt, L.L.P.

(57) ABSTRACT

An active-energy-ray-curable composition, a cured material of the active-energy-ray-curable composition satisfying a critical load of 5.0 g or more but 25.0 g or less, the critical load being obtained by a continuous loading test method using a variable normal load friction and wear measurement device, the cured material having an average thickness of 10 μm and being formed by coating the active-energy-ray-curable composition on a substrate and by irradiating and (Continued)

curing the active-energy-ray-curable composition with active energy rays having illuminance of 1.5 W/cm² and an amount of irradiation of 200 mJ/cm².

35 Claims, 6 Drawing Sheets

(51) Int. Cl.
*C09D 11/106* (2014.01)
*B41J 11/00* (2006.01)
*C09D 11/107* (2014.01)

(56) References Cited

U.S. PATENT DOCUMENTS

2006/0021537 A1* 2/2006 Ohtsu .................... B41J 11/002
 101/487
2009/0171007 A1 7/2009 Jonai et al.
2014/0242272 A1* 8/2014 Sherwood ............ C09D 183/02
 427/160
2015/0009265 A1 1/2015 Kohzuki et al.
2015/0077481 A1 3/2015 Yoshino et al.
2015/0130878 A1 5/2015 Kohzuki et al.
2015/0232675 A1 8/2015 Yoshino et al.
2016/0009931 A1 1/2016 Kohzuki et al.
2016/0075895 A1 3/2016 Kohzuki et al.
2016/0326387 A1 11/2016 Arita et al.
2016/0347961 A1 12/2016 Kobayashi et al.
2017/0015850 A1 1/2017 Yoshino et al.

FOREIGN PATENT DOCUMENTS

JP 5474882 2/2014
JP 2015-117359 6/2015

* cited by examiner

ACTIVE-ENERGY-RAY-CURABLE COMPOSITION, ACTIVE-ENERGY-RAY-CURABLE INK, TWO-DIMENSIONAL OR THREE-DIMENSIONAL IMAGE FORMING METHOD, TWO-DIMENSIONAL OR THREE-DIMENSIONAL IMAGE FORMING APPARATUS, AND CURED MATERIAL

CROSS-REFERENCE TO RELATED APPLICATIONS

The present application claims priority under 35 U.S.C. § 119 to Japanese Patent Application No. 2016-048918, filed Mar. 11, 2016. The contents of which are incorporated herein by reference in their entirety.

BACKGROUND OF THE INVENTION

Field of the Invention

The present disclosure relates to an active-energy-ray-curable composition, an active-energy-ray-curable ink, a two-dimensional or three-dimensional image forming method, a two-dimensional or three-dimensional image forming apparatus, and a cured material.

Description of the Related Art

Hitherto, active-energy-ray-curable inks have been supplied and used for offset printing, screen printing, and top coating agents. In recent years, an amount of the photopolymerizable inks used has increased because there are advantages that a process of drying the ink can be simplified to result in cost saving and an amount of a solvent volatilized can be reduced to attain environmental friendliness.

In recent years, there has increasingly been a demand to subject a cured material, which is obtained by ejecting an active-energy-ray-curable ink on a substrate and curing the active-energy-ray-curable ink, to molding process as post process. Therefore, there has been a demand to achieve rubfastness and high drawability of the cured material so as to be used in different forms.

However, when rubfastness becomes high, the cured material has fragility, reducing drawability. On the other hand, drawability becomes high, the cured material is deteriorated in hardness, reducing rubfastness. As described above, the rubfastness and the drawability are always in a trade-off relationship, and it is difficult to achieve both of the rubfastness and the drawability, which is problematic.

In order to solve the aforementioned problems, there has been proposed an active-energy-ray-curable ink including a monofunctional monomer and a multifunctional monomer (see Japanese Patent Nos. 5265916 and 5474882).

SUMMARY OF THE INVENTION

According to one aspect of the present disclosure, a cured material of an active-energy-ray-curable composition satisfies a critical load of 5.0 g or more but 25.0 g or less. The critical load is obtained by a continuous loading test method using a variable normal load friction and wear measurement device. The cured material has an average thickness of 10 µm and is formed by coating the active-energy-ray-curable composition on a substrate and by irradiating and curing the active-energy-ray-curable composition with active energy rays having illuminance of 1.5 W/cm$^2$ and an amount of irradiation of 200 mJ/cm$^2$.

DESCRIPTION OF THE EMBODIMENTS (Active-energy-ray-curable Composition)

Figure 1:
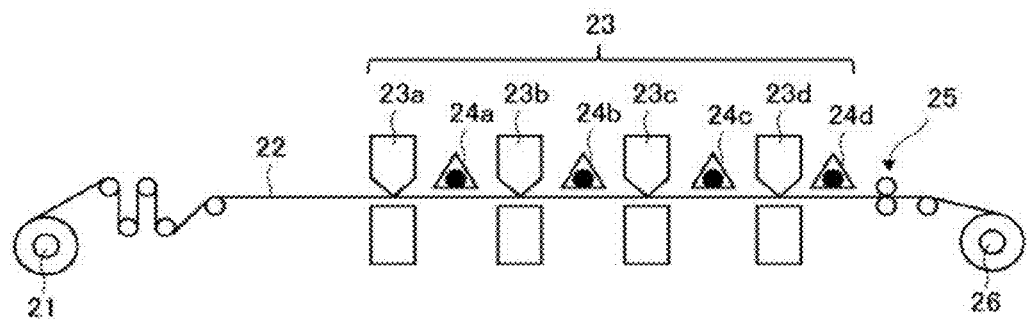
FIG. 1 is a schematic view of an example of an image forming apparatus of the present disclosure.

In the present disclosure, a cured material of an active-energy-ray-curable composition satisfies a critical load of 5.0 g or more but 25.0 g or less. The critical load is obtained by a continuous loading test method using a variable normal load friction and wear measurement device. The cured material has an average thickness of 10 µm and is formed by coating the active-energy-ray-curable composition on a substrate and by irradiating and curing the active-energy-ray-curable composition with active energy rays having illuminance of 1.5 W/cm$^2$ and an amount of irradiation of 200 mJ/cm$^2$. The active-energy-ray-curable composition further includes a monofunctional monomer, a multifunctional monomer, an oligomer, a resin, silica particles, a polymerization initiator, and other components, if necessary.

The active-energy-ray-curable composition of the present disclosure is based on the problem that the existing active-energy-ray-curable inks cannot sufficiently achieve drawability.

According to the present disclosure, it is possible to provide an active-energy-ray-curable composition, a cured material of which can achieve excellent rubfastness and drawability.

[Critical Load by Continuous Loading Test Method Using Variable Normal Load Friction and Wear Measurement Device]

Regarding the active-energy-ray-curable composition of the present disclosure, a cured material of the active-energy-ray-curable composition satisfies a critical load of 5.0 g or more but 25.0 g or less, preferably satisfies a critical load of 10.0 g or more but 20.0 g or less, more preferably satisfies 15.0 g or more but 20.0 g or less. The critical load is obtained by a continuous loading test method using a variable normal load friction and wear measurement device. The cured material has an average thickness of 10 µm and is formed by coating the active-energy-ray-curable composition on a substrate and by irradiating and curing the active-energy-ray-curable composition with active energy rays having illuminance of 1.5 W/cm$^2$ and an amount of irradiation of 200 mJ/cm$^2$. When the critical load is 5.0 g or more but 25.0 g or less, rubfastness and drawability can be achieved. Here, as a method for measuring the average thickness, the average thickness can be determined by measuring the cured material for a thickness using an electronic micrometer (available from ANRITSU CORPORATION) and averaging 10 thicknesses measured at 10 sites.

Note that, the critical load can be determined by "$W_1$" obtained under the following conditions (1) to (3) using a variable normal load friction and wear measurement system (device name: HHS2000, available from Shinto Scientific Co., Ltd.).

(1) Preparation of Cured Material

The active-energy-ray-curable composition of the present disclosure is coated on a slide glass (available from Artec Co., Ltd., 008534, 26 mm×76 mm, average thickness: 1 mm or more but 1.2 mm or less). Immediately after the coating, ultraviolet rays having illuminance of 1.5 W/cm$^2$ and an amount of irradiation of 200 mJ/cm$^2$ are emitted using an UV irradiator (device name: LH6, available from Fusion Systems Japan) to obtain a cured material having an average thickness of 10 μm. Here, as a method for measuring the average thickness, the average thickness can be determined by measuring the cured material for a thickness using an electronic micrometer (available from ANRITSU CORPORATION) and averaging 10 thicknesses measured at 10 sites.

(2) Measurement Conditions

Indenter: Sapphire stylus 0.1 mm, taper angle of the cone: 60 degrees

Friction distance: 25 mm

Friction speed: 0.5 mm/sec

Continuous loading: From 0 g through 50 g

Sensitivity: 10%

Number of measurements: Measured twice at different positions

Load converter (friction force): 19.61 N (2,000 gf (5,000 mV))

PC data acquisition: 10 msec×5,000 data=50 seconds (3) Method for Determining "$W_1$"

Figure 4:
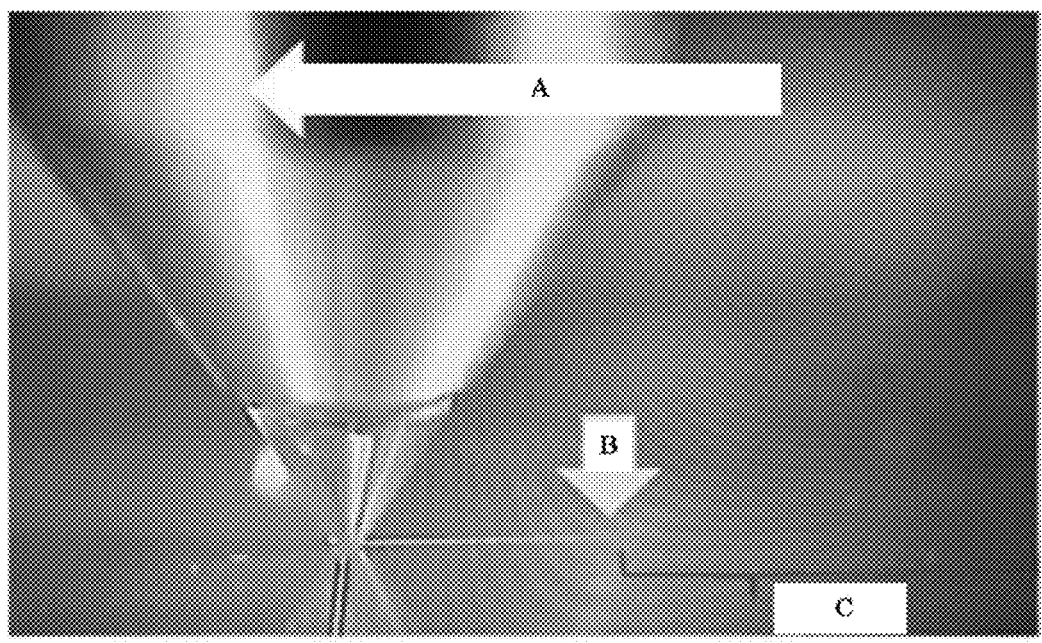
FIG. 4 is a picture presenting a state that a continuous loading test method using a variable normal load friction and wear measurement device is performed for measurement.
Figure 5:
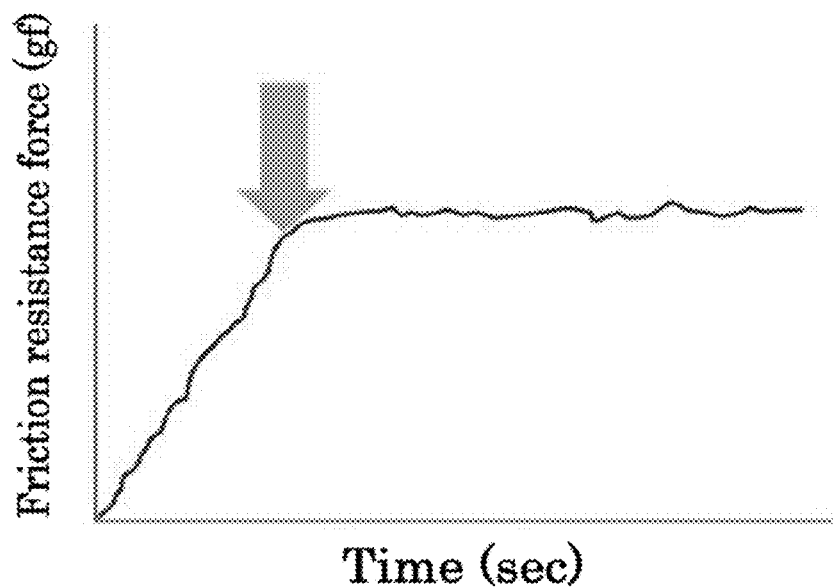
FIG. 5 is a graph presenting a change of the gradient in a relationship between a friction resistance force and a time obtained by the continuous loading test method.
Figure 6:
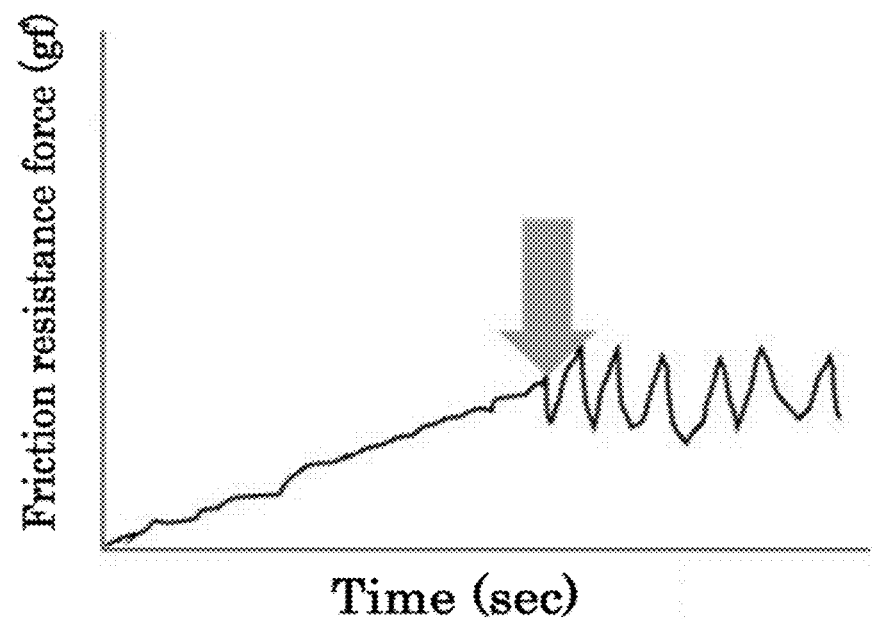
FIG. 6 is a graph presenting a change of the amplitude of a waveform in a relationship between a friction resistance force and a time obtained by the continuous loading test method.
Figure 7:
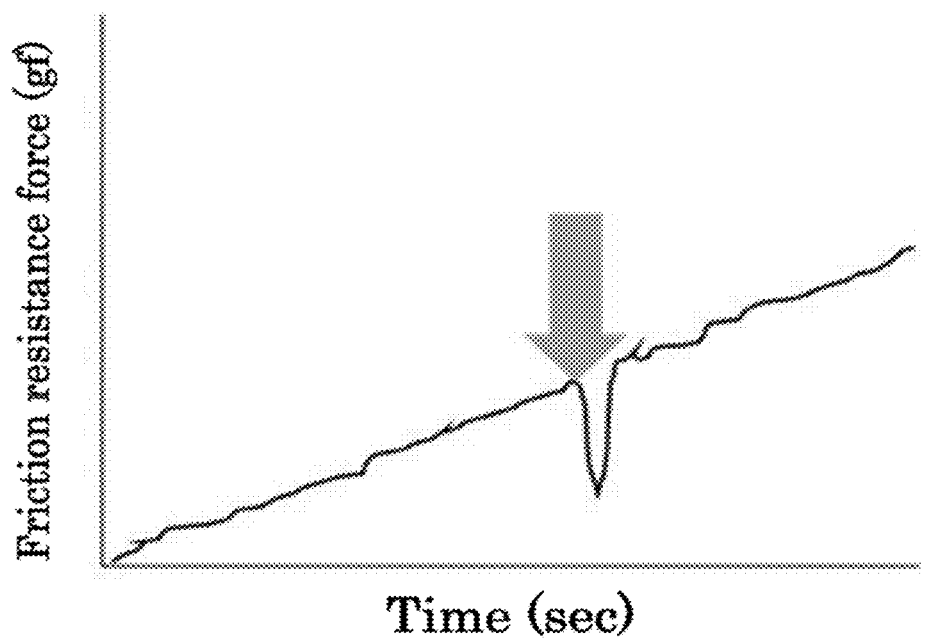
FIG. 7 is a graph presenting a difference in level in a relationship between a friction resistance force and a time obtained by the continuous loading test method.
Figure 8A:
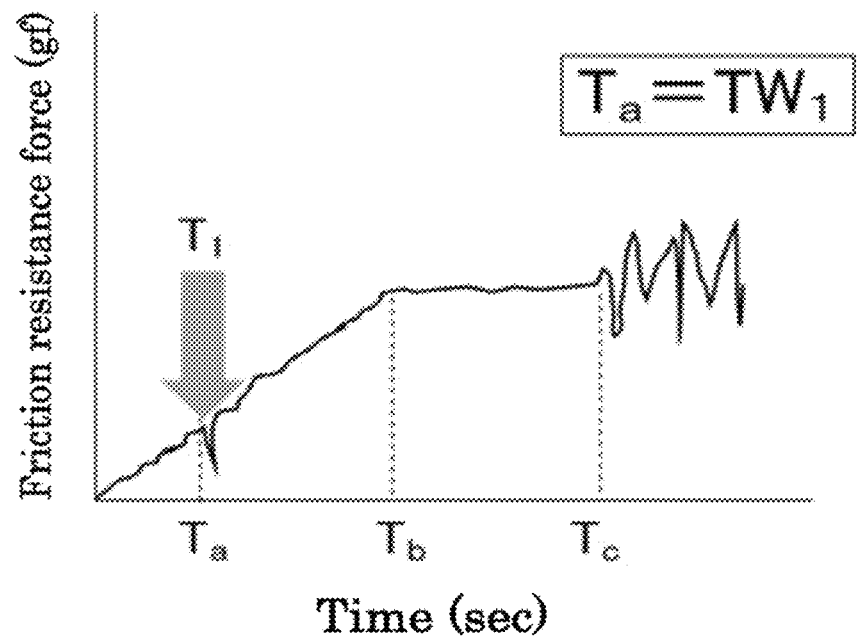
FIG. 8A is a graph presenting an example of a method for determining $TW_1$ obtained by the continuous loading test method.
Figure 8B:
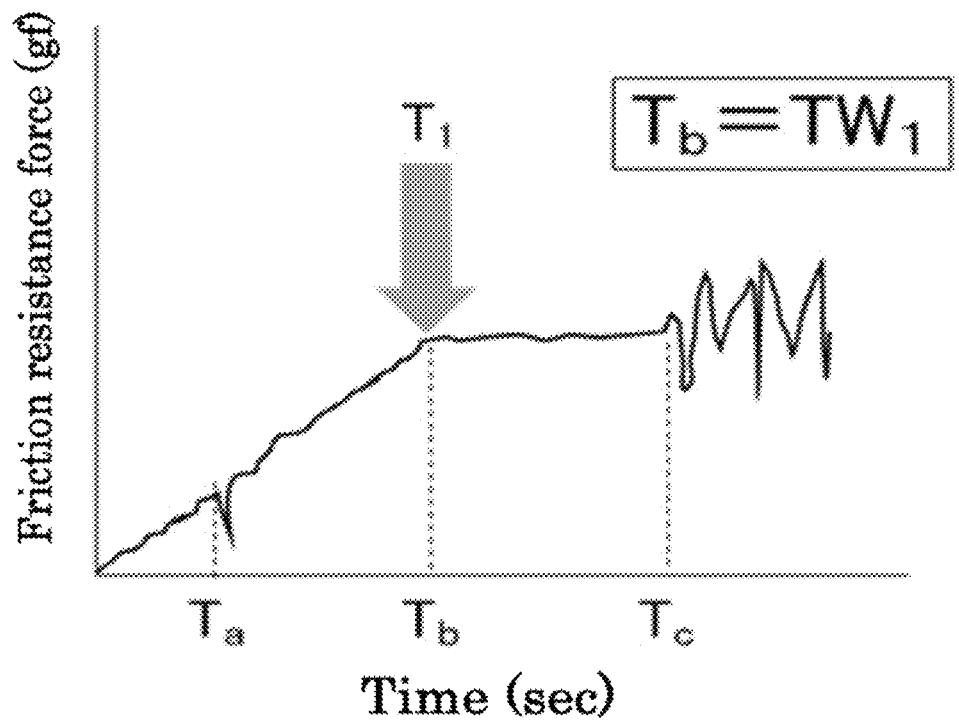
FIG. 8B is a graph presenting another example of a method for determining $TW_1$ obtained by the continuous loading test method.

A charge coupled device (CCD) camera is used to take a video of a state of measurement by a continuous loading test method. A time ($T_1$) when a scratch first occurs is measured (FIG. 4). In FIG. 4, "A" represents a direction of scratching under the application of a load, "B" represents a scratch, and "C" represents no scratch. When the entire measurement has been completed, a graph having a friction resistance force (unit: gf) in a vertical axis and a time (unit: sec) in a horizontal axis can be obtained. All of the discontinuities (change of the gradient (FIG. 5), change of the amplitude of a waveform (FIG. 6), and difference in level (FIG. 7)) are extracted from the graph. A time at the point of the change of the gradient, a time at the point of the change of the amplitude of a waveform, and a time at the point of the difference in level are defined as $T_a$, $T_b$, . . . . Here, among the $T_a$, the $T_b$ . . . , a time the closest to the $T_1$ is defined as $TW_1$ (FIG. 8). The obtained $TW_1$ can be used for calculating $W_1$ in the following Formula (1).

$$W_1 = TW_1 \quad \text{Formula (1)}$$

The above Formula (1) can be obtained based on the measurement condition that a load is increased from 0 g through 50 g for 50 seconds. The measurement is performed twice and an average of the obtained two values is used.

The active-energy-ray-curable composition of the present disclosure may include a monofunctional monomer including one ethylenically-unsaturated double bond and a resin, which makes it possible to improve drawability. Moreover, the active-energy-ray-curable composition of the present disclosure may include a multifunctional monomer including two or more ethylenically-unsaturated double bonds, an oligomer including an ethylenically-unsaturated double bond, and silica particles, which makes it possible to improve rubfastness.

<Monofunctional Monomer Including One Ethylenically-unsaturated Double Bond>

The monofunctional monomer includes one ethylenically-unsaturated double bond.

The monofunctional monomer including one ethylenically-unsaturated double bond can improve drawability.

The monofunctional monomer including one ethylenically-unsaturated double bond is not particularly limited and may be appropriately selected depending on the intended purpose. Examples of the monofunctional monomer including one ethylenically-unsaturated double bond include phenoxyethyl (meth)acrylate, tetrahydrofurfuryl (meth)acrylate, isobornyl (meth)acrylate, 2-hydroxyethyl (meth)acrylate, 4-hydroxybutyl (meth)acrylate, isobutyl (meth)acrylate, t-butyl (meth)acrylate, isooctyl (meth)acrylate, 2-methoxyethyl (meth)acrylate, methoxytriethylene glycol (meth)acrylate, 2-ethoxyethyl (meth)acrylate, 3-methoxybutyl (meth)acrylate, ethoxyethyl (meth)acrylate, butoxyethyl (meth)acrylate, ethoxydiethylene glycol (meth)acrylate, methoxydixylethyl (meth)acrylate, ethyl diglycol (meth)acrylate, cyclic trimethylolpropane formal mono(meth)acrylate, imide (meth)acrylate, isoamyl (meth)acrylate, ethoxylated succinic acid (meth)acrylate, trifluoroethyl (meth)acrylate, ω-carboxypolycaprolactone mono(meth)acrylate, N-vinylformamide, cyclohexyl (meth)acrylate, benzyl (meth)acrylate, methylphenoxyethyl (meth)acrylate, 4-t-butylcyclohexyl (meth)acrylate, caprolactone-modified tetrahydrofurfuryl (meth)acrylate, tribromophenyl (meth)acrylate, ethoxylated tribromophenyl (meth)acrylate, 2-phenoxyethyl (meth)acrylate, acryloyl morpholine, phenoxydiethylene glycol (meth)acrylate, vinylcaprolactam, vinylpyrrolidone, 2-hydroxy-3-phenoxypropyl (meth)acrylate, 1,4-cyclohexanedimethanol mono(meth)acrylate, 2-(2-ethoxyethoxy)ethyl (meth)acrylate, stearyl (meth)acrylate, diethylene glycol monobutyl ether(meth)acrylate, lauryl (meth)acrylate, isodecyl (meth)acrylate, 3,3,5-trimethylcyclohexanol (meth)acrylate, isooctyl (meth)acrylate, octyl/decyl (meth)acrylate, tridecyl (meth)acrylate, caprolactone (meth)acrylate, ethoxylated (4)nonylphenol (meth)acrylate, methoxy polyethylene glycol (350) mono(meth)acrylate, methoxy polyethylene glycol (550) mono(meth)acrylate, tetrahydrofurfuryl acrylate, isobornyl acrylate, phenoxyethyl acrylate, N-vinylcaprolactam, 1-adamantyl acrylate, isooctyl acrylate, stearyl acrylate, and acrylic acid ester. These may be used alone or in combination. Among them, tetrahydrofurfuryl acrylate, isobornyl acrylate, phenoxyethyl acrylate, N-vinylcaprolactam, 1-adamantyl acrylate, isooctyl acrylate, acryloyl morpholine, stearyl acrylate, and acrylic acid ester are preferable.

An amount of the monofunctional monomer including one ethylenically-unsaturated double bond is preferably 50% by mass or more but 100% by mass or less, more preferably 60% by mass or more but 100% by mass or less, particularly preferably 80% by mass or more but 100% by mass or less, relative to the total amount of the activeenergy-ray-curable composition. The amount of the monofunctional monomer including one ethylenically-unsaturated double bond satisfying 50% by mass or more but 100% by mass or less can improve drawability.

<Multifunctional Monomer Including Two or More Ethylenically-unsaturated Double Bonds>

The multifunctional monomer includes two or more ethylenically-unsaturated double bonds.

The multifunctional monomer including two or more ethylenically-unsaturated double bonds makes it possible to increase a degree of cross-linking in the resultant cured material, improving the resultant cured material in rubfastness.

The multifunctional monomer including two or more ethylenically-unsaturated double bonds is not particularly limited and may be appropriately selected depending on the intended purpose. Examples of the multifunctional monomer including two or more ethylenically-unsaturated double bonds include hexadiol diacrylate, trimethylolpropane tri(meth)acrylate, pentaerythritol tri(meth)acrylate, polyethylene glycol di(meth)acrylate, dipropylene glycol di(meth)acrylate, tripropylene glycol tri(meth)acrylate, neopentyl glycol di(meth)acrylate, bispentaerythritol hexa(meth)acrylate, ethylene glycol di(meth)acrylate, diethylene glycol di(meth)acrylate, 1,6-hexanediol di(meth)acrylate, ethoxylated-1,6-hexanediol di(meth)acrylate, polypropylene glycol di(meth)acrylate, 1,4-butanediol di(meth)acrylate, 1,9-nonanediol di(meth)acrylate, tetraethylene glycol di(meth)acrylate, 2-n-butyl-2-ethyl-1,3-propanediol di(meth)acrylate, hydroxypivalic acid neopentyl glycol di(meth)acrylate, 1,3-butylene glycol di(meth)acrylate, hydroxypivalic acid trimethylolpropane tri(meth)acrylate, ethoxylated phosphoric acid tri(meth)acrylate, ethoxylated tripropylene glycol di(meth)acrylate, neopentyl glycol-modified trimethylolpropane di(meth)acrylate, stearic acid-modified pentaerythritol di(meth)acrylate, pentaerythritol tri(meth)acrylate, tetramethylolpropane tri(meth)acrylate, tetramethylolmethane tri(meth)acrylate, pentaerythritol tetra(meth)acrylate, caprolactone-modified trimethylolpropane tri(meth)acrylate, propoxylated glyceryl tri(meth)acrylate, tetramethylolmethane tetra(meth)acrylate, pentaerythritol tetra(meth)acrylate, ditrimethylolpropane tetra(meth)acrylate, ethoxylated pentaerythritol tetra(meth)acrylate, dipentaerythritol hexa(meth)acrylate, caprolactone-modified dipentaerythritol hexa(meth)acrylate, dipentaerythritol hydroxypenta(meth)acrylate, neopentyl glycol oligo(meth)acrylate, 1,4-butanediol oligo(meth)acrylate, 1,6-hexanediol oligo(meth)acrylate, trimethylolpropane oligo(meth)acrylate, pentaerythritol oligo(meth)acrylate, ethoxylated neopentyl glycol di(meth)acrylate, propoxylated neopentyl glycol di(meth)acrylate, tripropylene glycol di(meth)acrylate, ethoxylated trimethylolpropane tri(meth)acrylate, propoxylated trimethylolpropane tri(meth)acrylate, and 1,6-hexanediol di(meth)acrylate. These may be used alone or in combination. Among them, 1,6-hexanediol di(meth)acrylate is preferable, 1,6-hexanediol diacrylate is more preferable.

The multifunctional monomer including two or more ethylenically-unsaturated double bonds is preferably a bifunctional monomer, and use of the bifunctional monomer alone is more preferable, in order to achieve further higher rubfastness.

An amount of the multifunctional monomer including two or more ethylenically-unsaturated double bonds is preferably 15% by mass or less, more preferably 13% by mass or less, still more preferably 10% by mass or less, particularly preferably 5% by mass or less, relative to the total amount of the active-energy-ray-curable composition. The amount of the multifunctional monomer including two or more ethylenically-unsaturated double bonds satisfying 15% by mass or less can improve the resultant cured material in drawability.

<Oligomer Including Ethylenically-unsaturated Double Bond>

The oligomer including an ethylenically-unsaturated double bond can improve rubfastness.

The oligomer including an ethylenically-unsaturated double bond preferably includes one or more ethylenically-unsaturated double bond(s). Here, the oligomer means a polymer having the number of repeating units of monomer structures is 2 or more but 20 or less.

A weight average molecular weight of the oligomer including an ethylenically-unsaturated double bond is not particularly limited and may be appropriately selected depending on the intended purpose. The weight average molecular weight of the oligomer including an ethylenically-unsaturated double bond is preferably 1,000 or more but 30,000 or less, more preferably 1,000 or more but 20,000 or less, particularly preferably 2,000 or more but 5,000 or less, in terms of the polystyrene conversion. The weight average molecular weight can be measured by, for example, gel permeation chromatography (GPC).

The oligomer including an ethylenically-unsaturated double bond is not particularly limited and may be appropriately selected depending on the intended purpose. Examples of the oligomer including an ethylenically-unsaturated double bond include aromatic urethane oligomers, aliphatic urethane oligomers, epoxy acrylate oligomers, polyester acrylate oligomers, and other special oligomers. These may be used alone or in combination. Among them, the oligomers including 2 or more but 5 or less unsaturated carbon-carbon bonds are preferable, the oligomers including 2 unsaturated carbon-carbon bonds are more preferable. When the number of the unsaturated carbon-carbon bonds is 2 or more but 5 or less, favorable rubfastness can be obtained.

As the oligomer including an ethylenically-unsaturated double bond, a commercially available product can be used. Examples of the commercially available product include: UV-2000B, UV-2750B, UV-3000B, UV-3010B, UV-3200B, UV-3300B, UV-3700B, UV-6640B, UV-8630B, UV-7000B, UV-7610B, UV-1700B, UV-7630B, UV-6300B, UV-6640B, UV-7550B, UV-7600B, UV-7605B, UV-7610B, UV-7630B, UV-7640B, UV-7650B, UT-5449, and UT-5454 (available from The Nippon Synthetic Chemical Industry Co., Ltd.); CN902, CN902J75, CN929, CN940, CN944, CN944B85, CN959, CN961E75, CN961H81, CN962, CN963, CN963A80, CN963B80, CN963E75, CN963E80, CN963J85, CN964, CN965, CN965A80, CN966, CN966A80, CN966B85, CN966H90, CN966J75, CN968, CN969, CN970, CN970A60, CN970E60, CN971, CN971A80, CN971J75, CN972, CN973, CN973A80, CN973H85, CN973J75, CN975, CN977, CN977C70, CN978, CN980, CN981, CN981A75, CN981B88, CN982, CN982A75, CN982B88, CN982E75, CN983, CN984, CN985, CN985B88, CN986, CN989, CN991, CN992, CN994, CN996, CN997, CN999, CN9001, CN9002, CN9004, CN9005, CN9006, CN9007, CN9008, CN9009, CN9010, CN9011, CN9013, CN9018, CN9019, CN9024, CN9025, CN9026, CN9028, CN9029, CN9030, CN9060, CN9165, CN9167, CN9178, CN9290, CN9782, CN9783, CN9788, and CN9893 (available from Sartomer); and EBECRYL210, EBECRYL220, EBECRYL230, EBECRYL270, KRM8200, EBECRYL5129, EBECRYL8210, EBECRYL8301, EBECRYL8804, EBECRYL8807, EBE- CRYL9260, KRM7735, KRM8296, KRM8452, EBECRYL4858, EBECRYL8402, EBECRYL9270, EBECRYL8311, and EBECRYL8701 (available from DAICEL-CYTEC Co., Ltd.). These may be used alone or in combination.

In addition to the commercially available product, a synthesized product obtained through synthesis can be used. The synthesized product and the commercially available product can be used in combination.

In addition to the aforementioned oligomers including an ethylenically-unsaturated double bond, urethane methacrylate (oligomer, product name: MIRAMER SIU100, available from TOYO CHEMICALS CO., LTD, weight average molecular weight: 6,500), ethoxylated bisphenol A diacrylate (oligomer, available from Shin Nakamura Chemical Co., Ltd., weight average molecular weight: 1,216), urethane acrylate (oligomer, product name: U-200PA, available from Shin Nakamura Chemical Co., Ltd., weight average molecular weight: 2,700), and ester-based urethane acrylate (product name: UX-5005, available from Nippon Kayaku Co., Ltd., weight average molecular weight: 4,500) can be suitably used.

An amount of the oligomer including an ethylenically-unsaturated double bond is preferably 10% by mass or less, more preferably 9% by mass or less, still more preferably 8% by mass or less, particularly preferably 5% by mass or less, relative to the total amount of the active-energy-ray-curable composition. When the amount of the oligomer including an ethylenically-unsaturated double bond is 10% by mass or less, the resultant cured material can be improved in rubfastness.

<Resin>

The resin can improve the entirety of the resultant cured material in molecular mobility, resulting in improvement of drawability.

The resin is not particularly limited and non-polymerizable resins that do not cause polymerization reaction under irradiation of active energy rays or heating can be appropriately selected. Specific examples of the resin include resins including no ethylenically-unsaturated double bond.

A weight average molecular weight of the resin is not particularly limited and may be appropriately selected depending on the intended purpose. The weight average molecular weight of the resin is preferably 1,500 or more, more preferably 2,000 or more, still more preferably 3,000 or more, particularly preferably 10,000 or more. The weight average molecular weight of the resin is preferably 70,000 or less, more preferably 30,000 or less, particularly preferably 20,000 or less. The weight average molecular weight of the resin is preferably 10,000 or more but 20,000 or less. The weight average molecular weight can be measured by, for example, gel permeation chromatography (GPC).

The resin preferably includes a cross-linked structure. A method for forming the cross-linked structure is not particularly limited and may be appropriately selected depending on the intended purpose. For example, a cross-linking agent can be used.

The cross-linking agent is not particularly limited and may be appropriately selected depending on the intended purpose. Examples of the cross-linking agent include triethanolamine and diethanolamine. These may be used alone or in combination.

The resin is not particularly limited and may be appropriately selected depending on the intended purpose. Examples of the resin include acrylic resins, polyester resins, vinyl resins, polyurethane resins, polyvinyl chloride resins, ketone resins, epoxy resins, nitrocellulose resins, phenoxy resins, and polymers selected from the mixtures of the aforementioned resins. These may be used alone or in combination. Among them, polyester resins and vinyl resins are preferable, polyester resins are more preferable.

—Polyester Resins—

As the polyester resins, the following polyester-modified resins can be used. For synthesizing the polyester-modified resins, for example, a polyester prepolymer including an isocyanate group can be used.

Examples of the polyester prepolymer including an isocyanate group (A) include matters, which are polycondensates of polyol (1) and polycarboxylic acid (2) and are obtained by reacting polyester including an active hydrogen group with polyisocyanate (3).

Examples of the active hydrogen group include hydroxyl groups (e.g., alcoholic hydroxyl groups and phenolic hydroxyl groups), amino groups, carboxyl groups, and mercapto groups. Among them, alcoholic hydroxyl groups are preferable.

Examples of the polyol (1) include diol (1-1) and trivalent or more polyol (1-2). Among them, diol (1-1) alone and a mixture of the diol (1-1) and a small amount of the trivalent or more polyol (1-2) are preferable.

Examples of the diol (1-1) include: alkylene glycols (e.g., ethylene glycol, 1,2-propylene glycol, 1,3-propylene glycol, 1,4-butanediol, and 1,6-hexanedion; alkylene ether glycols (e.g., diethylene glycol, triethylene glycol, dipropylene glycol, polyethylene glycol, polypropylene glycol, and poly tetramethylene ether glycol); alicyclic diols (e.g., 1,4-cyclohexane dimethanol and hydrogenated bisphenol A); bisphenols (e.g., bisphenol A, bisphenol F, and bisphenol S); alkylene oxide (e.g., ethylene oxide, propylene oxide, and butylene oxide) adducts of the alicyclic diols; and alkylene oxide (e.g., ethylene oxide, propylene oxide, and butylene oxide) adducts of the bisphenols. Among them, alkylene glycols including 2 or more but 12 or less carbon atoms and alkylene oxide adducts of the bisphenols are preferable. It is more preferable that an alkylene oxide adduct of the bisphenol and alkylene glycol including 2 or more but 12 or less carbon atoms be used in combination.

Examples of the trivalent or more polyol (1-2) include: trivalent or more but octavalent or less multivalent aliphatic alcohols and nonavalent or more multivalent aliphatic alcohols (e.g., glycerin, trimethylolethane, trimethylolpropane, pentaerythritol, and sorbitol); trivalent or more phenols (e.g., trisphenol PA, phenol novolak, and cresol novolak); and alkylene oxide adducts of the trivalent or more polyphenols.

Examples of the polycarboxylic acid (2) include dicarboxylic acid (2-1) and trivalent or more polycarboxylic acid (2-2). Among them, dicarboxylic acid (2-1) alone and a mixture of the dicarboxylic acid (2-1) and a small amount of the trivalent or more polycarboxylic acid (2-2) are preferable.

Examples of the dicarboxylic acid (2-1) include: alkylenedicarboxylic acids (e.g., succinic acid, adipic acid, and sebacic acid); alkenylenedicarboxylic acids (e.g., maleic acid and fumaric acid); and aromatic dicarboxylic acids (phthalic acid, isophthalic acid, terephthalic acid, and naphthalenedicarboxylic acid). Among them, alkenylenedicarboxylic acids including 4 or more but 20 or less carbon atoms and aromatic dicarboxylic acids including 8 or more but 20 or less carbon atoms are preferable.

Examples of the trivalent or more polycarboxylic acid (2-2) include aromatic polycarboxylic acids including 9 or more but 20 or less carbon atoms (e.g., trimellitic acid and pyromellitic acid).

Note that, the polycarboxylic acid (2) may be obtained by reacting the polyol (1) with an acid anhydride of the aforementioned compounds or a lower alkyl ester (e.g., methyl ester, ethyl ester, and isopropyl ester).

A mass ratio between an amount (% by mass) of the polyol (1) and an amount (% by mass) of the polycarboxylic acid (2) is preferably 2/1 or more but 1/1 or less, more preferably 1.5/1 or more but 1/1 or less, particularly preferably 1.3/1 or more but 1.02/1 or less, in terms of an equivalent ratio [OH]/[COOH] between hydroxyl groups [OH] and carboxyl groups [COOH].

Examples of the polyisocyanate (3) include: aliphatic polyisocyanates (e.g., tetramethylene diisocyanate, hexamethylene diisocyanate, and 2,6-diisocyanate methylcaproate); alicyclic polyisocyanates (e.g., isophorone diisocyanate and dicyclohexylmethane diisocyanate); aromatic diisocyanates (e.g., tolylene diisocyanate and diphenylmethane diisocyanate); aromatic aliphatic diisocyanates (e.g., $\alpha,\alpha,\alpha',\alpha'$-tetramethylxylylene diisocyanate); isocyanurates; and the polyisocyanates blocked with, for example, phenol derivatives, oxime, and caprolactam. These may be used alone or in combination.

A mass ratio between an amount (% by mass) of the polyester including an active hydrogen group and an amount (% by mass) of the polyisocyanate (3) is preferably 5/1 or more 1/1 or less, more preferably 4/1 or more but 1.2/1 or less, particularly preferably 2.5/1 or more but 1.5/1 or less, in terms of an equivalent ratio [NCO]/[OH] between isocyanate groups [NCO] and hydroxyl groups [OH] of polyester including hydroxyl groups.

The number of the isocyanate groups contained in one molecule of the prepolymer (A) including the isocyanate group is preferably 1 or more, more preferably 1.5 or more but 3 or less on average, particularly preferably 1.8 or more but 2.5 or less on average. When the number of the isocyanate groups is 1 or more in one molecular, an average molecular weight of the modified polyester obtained after cross-linkage and/or elongation can be increased.

An amount of the polyisocyanate (3) in the prepolymer (A) including the isocyanate group at a terminal is preferably 0.5% by mass or more but 40% by mass or less, more preferably 1% by mass or more but 3% by mass or less, particularly preferably 2% by mass or more but 20% by mass or less.

In the present disclosure, the resin component can include the modified polyester (A) alone. In addition, the resin component can include the unmodified polyester (C) in combination of the modified polyester (A). Use of the unmodified polyester (C) in combination of the modified polyester (A) makes it possible to improve the cured material in glossiness and gloss uniformity.

Examples of the unmodified polyester (C) include polycondensates of the polyol (1) and the polycarboxylic acid (2) which are similar to those of the polyester component of the prepolymer (A) including the isocyanate group. Preferable examples of the unmodified polyester (C) include the same ones as described in the prepolymer (A) including the isocyanate group.

In addition to the unmodified polyesters, the unmodified polyester (C) may be modified by a chemical bond other than a urea bond. The unmodified polyester (C) may be modified by, for example, a urethane bond. In terms of rubfastness and drawability, it is preferable that the prepolymer (A) including the isocyanate group be at least partially compatible with the unmodified polyester (C).

It is preferable that a polyester component of the prepolymer (A) including the isocyanate group have the same formulation as the formulation of the unmodified polyester (C).

When the resin includes the prepolymer (A) including the isocyanate group, a mass ratio (A/B) between an amount (% by mass) of the prepolymer (A) including the isocyanate group and an amount (% by mass) of the unmodified polyester (C) is preferably 5/95 or more but 75/25 or less, more preferably 10/90 or more but 25/75 or less, still more preferably 12/88 or more but 25/75 or less, particularly preferably 12/88 or more but 22/78 or less. The mass ratio (A/B) satisfying 5/95 or more but 75/25 or less makes it possible to improve rubfastness.

A weight average molecular weight of the unmodified polyester (C) is preferably 1,000 or more but 30,000 or less, more preferably 1,500 or more but 10,000 or less, particularly preferably 2,000 or more but 8,000 or less.

A hydroxyl value of the unmodified polyester (C) is preferably 5 mg KOH/g or less or more, more preferably 10 mg KOH/g or more but 120 mg KOH/g or less, particularly preferably 20 mg KOH/g or more but 80 mg KOH/g or less.

An acid value of the unmodified polyester (C) is preferably 0.5 mg KOH/g or more but 40 mg KOH/g or less, more preferably 5 mg KOH/g or more but 35 mg KOH/g or less. When the hydroxyl value and the acid value fall within the aforementioned ranges, the active-energy-ray-curable composition hardly undergoes environmental influence under the high temperature and high humidity environment or the low temperature and low humidity environment, which can prevent the cured material from degradation.

Here, the hydroxyl value and the acid value can be measured according to the method described in the JIS K0070-1992, for example.

-Vinyl Resins-

The vinyl resins are polymers obtained through polymerization of a vinyl monomer alone or through copolymerization. Examples of the vinyl resins include: styrene-(meth) acrylic acid ester resin; styrene-butadiene copolymer; (meth)acrylic acid-acrylic acid ester polymer; styrene-acrylonitrile copolymer; styrene-maleic anhydride copolymer; styrene and polymers of its substitute (e.g., styrene-(meth) acrylic acid copolymer, polystyrene, poly-p-chlorostyrene, and polyvinyltoluene); styrene-based copolymers (e.g., styrene-p-chlorostyrene copolymer, styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl $\alpha$-chloromethacrylate copolymer, styrene-acrylonitrile copolymer, styrene-methyl vinyl ketone copolymer, styrene-butadiene copolymer, styrene-isoprene copolymer, styrene-acrylonitrile-indene copolymer, styrene-maleic acid copolymer, and styrene-maleic acid ester copolymer); polymethyl methacrylate; and polybutyl methacrylate. These may be used alone or in combination.

The resin may be a commercially available product. Examples of the commercially available product include: commercially available products of acrylic resins such as JONCRYL (available from BASF Japan Ltd.), S-LEC P (available from SEKISUI CHEMICAL CO., LTD.), ELVACITE 4026, and ELVACITE 2028 (available from Lucite International, Inc); commercially available products of polyester resins such as ELITEL (available from Unitika Limited.) and VYLON (available from TOYOBO CO., LTD.); commercially available products of polyurethane resins such as VYLON UR (available from TOYOBO CO., LTD.), NT-HILAMIC (available from Dainichiseika Color & Chemicals Mfg. Co., Ltd.), CRISVON (available from DIC Corporation), and NIPPOLAN (available from Nippon Polyurethane Industry Co., Ltd.); commercially available products of PVC resins such as SOLBIN (available from Nissin Chemical Industry Co., Ltd.), VINYBLAN (available from Nissin Chemical Industry Co., Ltd.), SARAN-LATEX (available from Asahi Chemical Industry Co., Ltd.), SUMI-ELITE (available from Sumitomo Chemical Company, Limited), SEKISUI PVC (available from SEKISUI CHEMICAL CO., LTD.), and UCAR (available from The Dow Chemical Company); commercially available products of ketone resins such as HILACK (available from Hitachi Chemical Company, Ltd.) and SK (available from Degussa); commercially available products of epoxy resins such as EPPN-201 (available from Nippon Kayaku Co., Ltd.) and HP-7200 (available from DIC Corporation); commercially available products of nitrocellulose resins such as HIG, LIG, SL, and VX (available from Asahi Kasei Corp.); commercially available products of industrial nitrocellulose resins such as RS and SS (available from Daicel Corporation); and commercially available products of phenoxy resins such as YP-50 and YP-50S (available from NIPPON STEEL & SUMIKIN CHEMICAL CO., LTD.). These may be used alone or in combination.

In addition to the commercially available product, a synthesized product obtained through synthesis can be used. The synthesized product can be used in combination of the commercially available product. In cases where the resin is obtained through synthesis, a material including an ethylenically-unsaturated double bond may be used as a starting material for the synthesis.

A glass transition temperature of the resin is preferably 10.0° C. or more in order to increase hardness of the cured material.

An amount of the resin is preferably 3% by mass or more relative to the total amount of the active-energy-ray-curable composition in order to increase drawability of the cured material.

[Quantitative Method of Each Component Contained in Active-energy-ray-curable Composition]

Examples of a quantitative method of the monofunctional monomer including one ethylenically-unsaturated double bond, the multifunctional monomer including two or more ethylenically-unsaturated double bonds, the oligomer including an ethylenically-unsaturated double bond, and the resin contained in the active-energy-ray-curable composition of the present disclosure include: a method for performing quantitative analysis from a peak intensity obtained through GCMS measurement; a method for performing quantitative analysis from a peak intensity obtained through the molecular weight distribution measurement by gel permeation chromatography (GPC); and a method for performing quantitative analysis from an integrated value obtained through $^1$H-NMR measurement. One specific example of the quantitative method is a method including preparing a calibration curve. In a convenient manner, a standard sample for each component (e.g., a sample including 15% by mass of a multifunctional monomer to be measured) is prepared and measured under the same conditions, which makes it possible to relatively evaluate whether the amount of the component is larger or smaller. When an amount of each component in the production of the active-energy-ray-curable composition is already known, that amount is defined as an amount of each component.

When the kind of each component is unknown, qualitative analysis can be performed in advance by, for example, GCMS or $^1$H-NMR. A glass transition temperature of homopolymer can be measured by, for example, differential scanning calorimetry (DSC). The glass transition temperature obtained by the differential scanning calorimetry (DSC) can be measured by extracting the sample with a poor solvent of polymer and taking out the polymer component.

Measurement conditions of the method for performing quantitative analysis from a peak intensity obtained through the molecular weight distribution measurement by gel permeation chromatography (GPC) are presented as follows.
-Measurement Conditions in GPC-
 Device: GPC
 Detector: RI
 Column: TSK gel GMHHR-N (diameter: 7.8 mm×30 cm, available from Tosoh Corporation), two bands
 Solvent: tetrahydrofuran (THF)
 Flow velocity: 1.0 mL/min
 Column temperature: 23° C.
 Injection amount: 0.02 mL
 Sample preparation: Under shielding light, the sample is diluted with THF so as to have a concentration of 3% by mass and is filtered through a filter having an average pore diameter of 0.45 μm. The resultant sample is used as a measurement sample.

[Qualitative Method of Resin]
Examples of the qualitative method of the resin include: a method for performing qualitative analysis from a peak intensity obtained through pyrolysis-gas chromatography-mass spectroscopy (Py-GCMS) measurement; and a method for performing qualitative analysis from an integrated value obtained through $^1$H NMR measurement.

Analysis conditions of the method for performing qualitative analysis from a peak intensity obtained through pyrolysis-gas chromatography-mass spectroscopy (Py-GCMS) measurement are presented as follows.
-Analysis Conditions by Py-GCMS-
 Device: QP2010, available from SHIMADZU CORPORATION
 MJT-2020D, available from Frontier Laboratories Ltd.
 Thermal decomposition temperature: 350° C.
 Column: ULTRA ALLOY-5, L=30 m, I.D=0.25 mm, Film=0.25 μm
 Column temperature: from 40° C. (retention time: 2 minutes) through 80° C. (heating: 5° C./min) through 320° C. (retention time: 7 minutes)
 Split ratio: 1:100
 Column flow rate: 1.01 mL/min
 Ionization method: EI method (70 eV)
 Measurement mode: Scan mode <Silica Particles>
The silica particles can improve rubfastness.
The silica particles are not particularly limited and a shape of the silica particles may be appropriately selected depending on the intended purpose.

The shape of the silica particles is not particularly limited and may be appropriately selected depending on the intended purpose. Examples of the shape include a spherical shape and an amorphous shape.

An average primary particle diameter of the silica particles is not particularly limited and may be appropriately selected depending on the intended purpose. The average primary particle diameter of the silica particles is preferably 10 nm or more but 1,000 nm or less, more preferably 10 nm or more but 500 nm or less, particularly preferably 40 nm or more but 60 nm or less.

As the silica particles, a commercially available product can be used. Examples of the commercially available product include SICASTAR (Registered Trademark) (available from COREFRONT Corporation).

An amount of the silica particles is preferably 0.3% by mass or more but 5.0% by mass or less, more preferably 0.5% by mass or more but 2.0% by mass or less, relative to the total amount of the active-energy-ray-curable composition.

<Polymerization Initiator>

The active-energy-ray-curable composition of the present disclosure optionally contains a polymerization initiator.

The polymerization initiator produces active species such as a radical or a cation upon application of energy of an active energy ray and initiates polymerization of a polymerizable compound (monomer or oligomer). As the polymerization initiator, it is suitable to use a known radical polymerization initiator, cation polymerization initiator, base producing agent, or a combination thereof. Of these, a radical polymerization initiator is preferable. Moreover, the polymerization initiator preferably accounts for 5 percent by weight to 20 percent by weight of the total content of the composition (100 percent by weight) to obtain sufficient curing speed.

Specific examples of the radical polymerization initiators include, but are not limited to, aromatic ketones, acylphosphine oxide compounds, aromatic onium chlorides, organic peroxides, thio compounds (thioxanthone compounds, thiophenyl group containing compounds, etc.), hexaaryl biimidazole compounds, ketoxime ester compounds, borate compounds, azinium compounds, metallocene compounds, active ester compounds, compounds having a carbon halogen bond(s), and alkyl amine compounds.

In addition, a polymerization accelerator (sensitizer) is optionally used together with the polymerization initiator. The polymerization accelerator is not particularly limited. Preferred examples thereof include, but are not limited to, amines such as trimethylamine, methyl dimethanol amine, triethanol amine, p-diethylamino acetophenone, p-dimethyl amino ethylbenzoate, p-dimethyl amino benzoate-2-ethyl-hexyl, N,N-dimthyl benzylamine and 4,4'-bis(diethylamino) benzophenone. The content thereof is determined depending on the identity (type) of the polymerization initiator and the content thereof.

In addition to the aforementioned polymerization initiators, examples of the polymerization initiator include an α-hydroxyketone polymerization initiator and an α-hydroxyacetophenone polymerization initiator. These may be used alone or in combination. Among them, an α-hydroxyacetophenone polymerization initiator is preferable.

The α-hydroxyacetophenone polymerization initiator may include a hydroxyacetophenone structure in its structure and also means α-hydroxyacetophenone-based polymerization initiator.

The α-hydroxyketone polymerization initiator is not particularly limited and may be appropriately selected depending on the intended purpose. Examples of the α-hydroxyketone polymerization initiator include hydroxy-cyclohexyl-phenyl-ketone.

The α-hydroxyacetophenone polymerization initiator is not particularly limited and may be appropriately selected depending on the intended purpose. Examples of the α-hydroxyacetophenone polymerization initiator include 2-hydroxy-1-{4-[4-(2-hydroxy-2-methyl-propionyl)-benzyl]phenyl}-2-methyl-propan-1-one.

As the polymerization initiator, a commercially available product can be used. The commercially available product is not particularly limited and may be appropriately selected depending on the intended purpose. Examples of the commercially available product include product name: IRGACURE 184 (available from BASF), product name: IRGACURE 127 (available from BASF), product name: LUCIRIN TPO (available from BASF); and product name: KAYACURE-DETX-S (available from Nippon Kayaku Co., Ltd.). These may be used alone or in combination.

An amount of the polymerization initiator is preferably 3.0% by mass or more but 30.0% by mass or less, more preferably 6.0% by mass or more but 20.0% by mass or less, relative to the total amount of the active-energy-ray-curable composition.

<Organic Solvent>

The active-energy-ray-curable composition of the present disclosure optionally contains an organic solvent although it is preferable to spare it. The curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1 percent by mass.

<Other Components>

The active-energy-ray-curable composition of the present disclosure optionally contains other known components. The other known components are not particularly limited. Specific examples thereof include, but are not limited to, known articles such as surfactants, polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, (regulators), and thickeners.

<Viscosity>

The viscosity of the active-energy-ray-curable composition of the present disclosure has no particular limit because it can be adjusted depending on the purpose and application devices. For example, if an ejecting device that ejects the composition from nozzles is employed, the viscosity thereof is preferably in the range of 3 mPa·s to 40 mPa·s, more preferably 5 mPa·s to 15 mPa·s, and particularly preferably 6 mPa·s to 12 mPa·s in the temperature range of 20 degrees C. to 65 degrees C., preferably at 25 degrees C. In addition, it is particularly preferable to satisfy this viscosity range by the composition free of the organic solvent described above. Incidentally, the viscosity can be measured by a cone plate rotary viscometer (VISCOMETER TVE-22L, manufactured by TOKI SANGYO CO., LTD.) using a cone rotor (1° 34'×R24) at a number of rotation of 50 rpm with a setting of the temperature of hemathermal circulating water in the range of 20 degrees C. to 65 degrees C. VISCOMATE VM-150III can be used for the temperature adjustment of the circulating water.

<Active Energy Rays>

Active energy rays used for curing an active-energy-ray-curable composition of the present disclosure are not particularly limited, so long as they are able to give necessary energy for allowing polymerization reaction of polymerizable components in the composition to proceed. Examples of the active energy rays include electron beams, α-rays, β-rays, γ-rays, and X-rays, in addition to ultraviolet rays.

When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

<Application Field>

The application field of the active-energy-ray-curable composition of the present disclosure is not particularly limited. It can be applied to any field where active-energy-ray-curable compositions are used. For example, the curable composition is selected to a particular application and used for a resin for processing, a paint, an adhesive, an insulant, a releasing agent, a coating material, a sealing material, various resists, and various optical materials.

Figure 2:
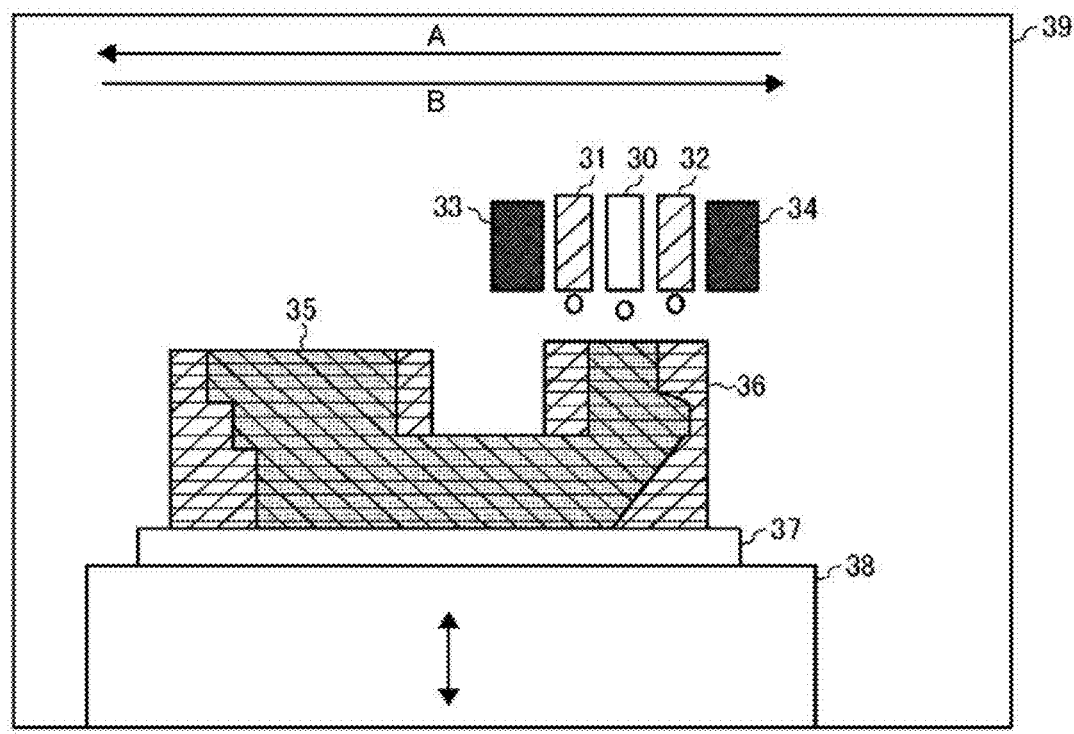
FIG. 2 is a schematic view of an example of another image forming apparatus of the present disclosure.
Figure 3A:
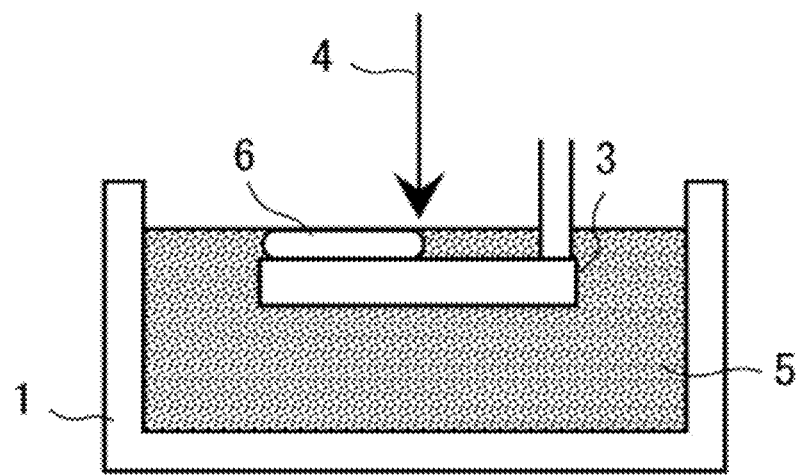
FIG. 3A is a schematic view of an example of still another image forming apparatus of the present disclosure.
Figure 3B:
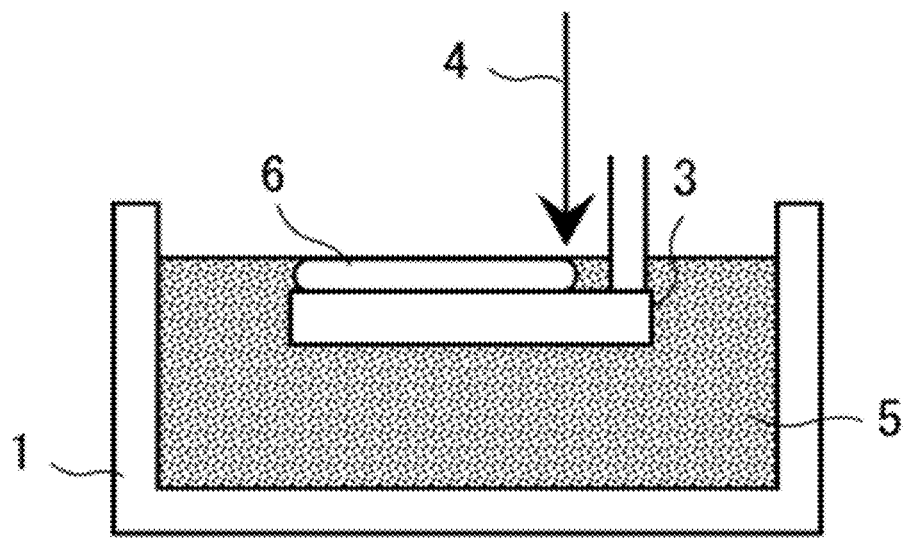
FIG. 3B is a schematic view of an example of still another image forming apparatus of the present disclosure.
Figure 3C:
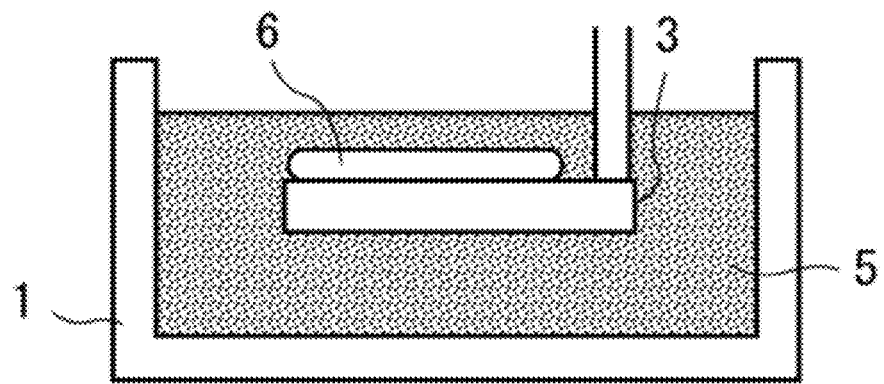
FIG. 3C is a schematic view of an example of still another image forming apparatus of the present disclosure.
Figure 3D:
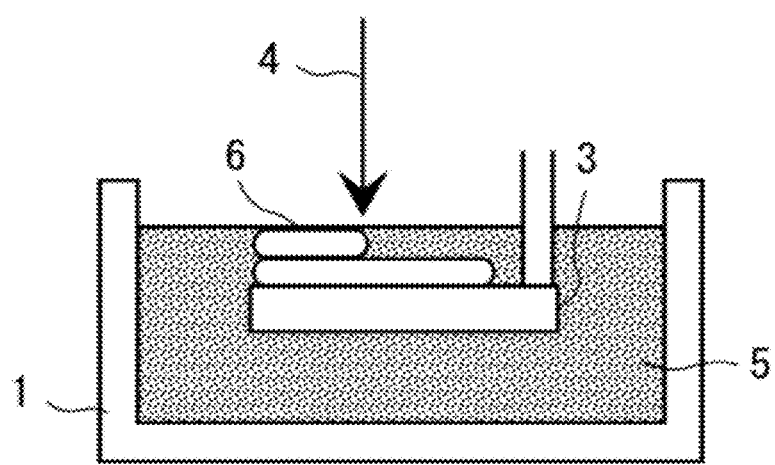
FIG. 3D is a schematic view of an example of still another image forming apparatus of the present disclosure.

Furthermore, the active-energy-ray-curable composition of the present disclosure can be used as an ink to form two-dimensional texts, images, and designed coating film on various substrates and in addition as a solid object forming material to form a three-dimensional object. This three dimensional object forming material may also be used as a binder for powder particles used in a powder layer laminating method of forming a three-dimensional object by repeating curing and layer-forming of powder layers, and as a three-dimensional object constituent material (a model material) and a supporting member used in an additive manufacturing method (a stereolithography method) as illustrated in FIG. 2, FIG. 3A, FIG. 3B, FIG. 3C, and FIG. 3D. FIG. 2 is a diagram illustrating a method of additive manufacturing to sequentially form layers of the active-energy-ray-curable composition of the present disclosure one on top of the other by repeating discharging the curable composition to particular areas followed by curing upon irradiation of an active energy ray (details will be described below). FIGS. 3A to 3D are each a diagram illustrating a method of additive manufacturing to sequentially form cured layers 6 having respective predetermined forms one on top of the other on a movable stage 3 by irradiating a storing pool (storing part) 1 of the active energy ray curable composition 5 of the present disclosure with the active energy ray 4.

An apparatus for fabricating a three-dimensional object by the active-energy-ray-curable composition of the present disclosure is not particularly limited and can be a known apparatus. For example, the apparatus includes a containing device, a supplying device, and a discharging device of the curable composition, and an active energy ray irradiator.

In addition, the present disclosure includes cured materials obtained by curing the active-energy-ray-curable composition and processed products obtained by processing structures having the cured materials on a substrate. The processed product is fabricated by, for example, heat-drawing and punching a cured material or structure having a sheet-like form or film-like form. Examples thereof are gauges or operation panels of vehicles, office machines, electric and electronic machines, and cameras.

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

(Active-energy-ray-curable Ink)

An active-energy-ray-curable ink of the present disclosure (hereinafter may be referred to as "ink") includes the active-energy-ray-curable composition of the present disclosure and is preferably for inkjet.

A static surface tension of the active-energy-ray-curable ink at 25° C. is preferably 20 mN/m or more but 40 mN/m or less, more preferably 28 mN/m or more but 35 mN/m or less.

The static surface tension is measured at 25° C. using a static surface tension meter (available from Kyowa Interface Science Co., Ltd, CBVP-Z model). The static surface tension is considered so as to be used in specifications of commercially available inkjet discharging heads such as GEN4 (available from Ricoh Printing Systems, Ltd.).

A viscosity of the active-energy-ray-curable ink of the present disclosure is not particularly limited so long as it may be appropriately adjusted depending on applications and application units. For example, when an ejecting unit configured to eject the composition from nozzles is employed, the viscosity of the active-energy-ray-curable ink is preferably 3 mPa·s or more but 40 mPa·s or less, more preferably 5 mPa·s or more but 15 mPa·s or less, particularly preferably 6 mPa·s or more but 12 mPa·s or less within a range of from 20° C. through 65° C., desirably at 25° C. In addition, it is particularly preferable that the viscosity satisfy the aforementioned range without incorporating the aforementioned solvent into the active-energy-ray-curable ink. Here, the viscosity can be measured by a cone plate rotary viscometer (VISCOMETER TVE-22L, available from Toki Sangyo Co., Ltd) using a cone rotor (1° 34'×R24) at the number of rotation of 50 rpm by appropriately setting a temperature of hemathermal circulating water to a range of from 20° C. through 65° C. In order to adjust a temperature of the circulating water, VISCOMATE VM-150III can be used.

<Composition Stored Container>

The composition stored container of the present disclosure contains the active-energy-ray-curable composition and is suitable for the applications as described above. For example, if the active-energy-ray-curable composition of the present disclosure is used for ink, a container that stores the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

<Image Forming Method and Image Forming Apparatus>

The image forming method of the present disclosure includes at least an irradiating step of irradiating the curable composition of the present disclosure with an active energy ray to cure the curable composition. The image forming apparatus of the present disclosure includes at least an irradiator to irradiate the curable composition of the present disclosure with an active energy ray and a storing part containing the active-energy-ray-curable composition of the present disclosure. The storing part may include the container mentioned above. Furthermore, the method and the apparatus may respectively include a discharging step and a discharging device to discharge the active energy ray curable composition. The method of discharging the curable composition is not particularly limited, and examples thereof include a continuous jetting method and an on-demand method. The on-demand method includes a piezo method, a thermal method, an electrostatic method, etc.

FIG. 1 is a diagram illustrating a two-dimensional image forming apparatus equipped with an inkjet discharging device. Printing units 23a, 23b, 23c, and 23d respectively having ink cartridges and discharging heads for yellow, magenta, cyan, and black active-energy-ray-curable inks discharge the inks onto a recording medium 22 fed from a supplying roller 21. Thereafter, light sources 24a, 24b, 24c, and 24d configured to cure the inks emit active energy rays to the inks, thereby curing the inks to form a color image. Thereafter, the recording medium 22 is conveyed to a processing unit 25 and a printed matter reeling roll 26. Each of the printing unit 23a, 23b, 23c and 23d may have a heating mechanism to liquidize the ink at the ink discharging portion. Moreover, in another embodiment of the present disclosure, a mechanism may optionally be included to cool down the recording medium to around room temperature in a contact or non-contact manner. In addition, the inkjet recording method may be either of serial methods or line methods. The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 22 is not particularly limited. Specific examples thereof include, but are not limited to, paper, film, metal, or complex materials thereof. The recording medium 22 takes a sheet-like form but is not limited thereto. The image forming apparatus may have a one-side printing configuration and/or a two-side printing configuration.

Optionally, multiple colors can be printed with no or weak active energy ray from the light sources 24a, 24b, and 24c followed by irradiation of the active energy ray from the light source 24d. As a result, energy and cost can be saved.

The recorded matter having images printed with the ink of the present disclosure includes articles having printed images or texts on a plain surface of conventional paper, resin film, etc., a rough surface, or a surface made of various materials such as metal or ceramic. In addition, by laminating layers of images in part or the entire of a recording medium, a partially stereoscopic image (formed of two dimensional part and three-dimensional part) and a three dimensional objects can be fabricated.

FIG. 2 is a schematic diagram illustrating another example of the image forming apparatus (apparatus to fabricate a 3D object) of the present disclosure. An image forming apparatus 39 illustrated in FIG. 2 sequentially forms thin layers one on top of the other using a head unit having inkjet heads arranged movable in the directions indicated by the arrows A and B. In the image forming apparatus 39, an ejection head unit 30 for additive manufacturing ejects a first active-energy-ray-curable composition, and ejection head units 31 and 32 for support and curing these compositions ejects a second active-energy-ray-curable composition having a different composition from the first active-energy-ray-curable composition, while ultraviolet irradiators 33 and 34 adjacent to the ejection head units 31 and 32 cure the compositions. To be more specific, for example, after the ejection head units 31 and 32 for support eject the second active-energy-ray-curable composition onto a substrate 37 for additive manufacturing and the second active-energy-ray-curable composition is solidified by irradiation of an active energy ray to form a first substrate layer having a space for composition, the ejection head unit 30 for additive manufacturing ejects the first active-energy-ray-curable composition onto the pool followed by irradiation of an active energy ray for solidification, thereby forming a first additive manufacturing layer. This step is repeated multiple times lowering the stage 38 movable in the vertical direction to laminate the supporting layer (or support layer) and the additive manufacturing layer to fabricate a solid object 35. Thereafter, an additive manufacturing support 36 is removed, if desired. Although only a single ejection head unit 30 for additive manufacturing is provided to the image forming apparatus illustrated 39 in FIG. 2, it can have two or more units 30.

(Cured Material and Processed Product)

A cured material of the present disclosure includes a substrate and a cured film that is obtained by irradiating and curing an active-energy-ray-curable composition of the present disclosure with active energy rays on the substrate.

The cured material can be obtained by forming a coated film using the image forming apparatus of the present disclosure and irradiating the coated film with ultraviolet rays so as to rapidly cure the coated film on the substrate.

The cured material of the present disclosure also includes a processed product obtained by subjecting the cured material to a stretching process.

The processed product can be obtained by subjecting the cured material to heat stretching and molding process in each print medium. Here, the stretching process means pulling a material under heating for stretching to mold the material into a certain shape, or simply stretching the material.

The processed product is not particularly limited and may be appropriately selected depending on the intended purpose. The processed product is preferably used by decorating and molding the processed product, which is preferably used for applications (e.g., surfaces of meters and operation panels of, for example, vehicles, office machines, electric and electronic machines, and cameras).

EXAMPLES

The present disclosure will be described by way of the following Examples. However, the present disclosure should not be construed as being limited to these Examples.

Note that, a critical load ($W_1$) and a weight average molecular weight of resins were measured as follows.
<Critical Load ($W_1$)>

The critical load ($W_1$) was determined by "$W_1$" obtained under the following conditions (1) to (3) using a variable normal load friction and wear measurement system (device name: HHS2000, available from Shinto Scientific Co., Ltd.).
(1) Preparation of Cured Material The active-energy-ray-curable composition was coated on a slide glass (available from Artec Co., Ltd., 008534, 26 mm×76 mm, average thickness: 1 mm or more but 1.2 mm or less) so that a cured material to be obtained would have an average thickness of 10 μm. Immediately after the coating, ultraviolet rays having illuminance of 1.5 W/cm$^2$ and an amount of irradiation of 200 mJ/cm$^2$ were emitted using an UV irradiator (device name: LH6, available from Fusion Systems Japan) to obtain a cured material having average thickness of 10 μm. Here, as a method for measuring the average thickness, the average thickness was determined by measuring the cured material for a thickness using an electronic micrometer (available from ANRITSU CORPORATION) and averaging 10 thicknesses measured at 10 sites.

(2) Measurement Conditions

Indenter: Sapphire stylus 0.1 mm, taper angle of the cone: 60 degrees

Friction distance: 25 mm

Friction speed: 0.5 mm/sec

Continuous loading: From 0 g through 50 g

Sensitivity: 10%

Number of measurements: Measured twice at different positions

Load converter (friction force): 19.61 N (2,000 gf (5,000 mV))

PC data acquisition: 10 msec×5,000 data=50 seconds (3) Method for Determining "$W_1$"

A charge coupled device (CCD) camera was used to take a video of a state of measurement by a continuous loading test method. A time ($T_1$) when a scratch first occurred was measured. When the entire measurement had been completed, a graph having a friction resistance force (unit: gf) in a vertical axis and a time (unit: sec) in a horizontal axis was obtained. All of the discontinuities (change of the gradient, change of the amplitude of a waveform, and difference in level) were extracted from the graph. A time at the point of the change of the gradient, a time at the point of the change of the amplitude of a waveform, and a time at the point of the difference in level were defined as $T_a$, $T_b$, . . . . Here, among the $T_a$, the $T_b$ . . . , a time the closest to the $T_1$ was defined as $TW_1$. The obtained $TW_1$ was used for calculating $W_1$ in the following Formula (1).

$$W_1 = TW_1 \quad (1)$$

The above Formula (1) was obtained based on the measurement condition that a load was increased from 0 g through 50 g for 50 seconds. The measurement was performed twice and an average of the obtained two values was used.

<Weight Average Molecular Weight>

The resin was measured for a weight average molecular weight using GPC based on the following conditions.

-Measurement Conditions in GPC-

Device: GPC

Detector: RI

Column: TSK gel GMHHR-N (diameter: 7.8 mm×30 cm, available from Tosoh Corporation), two bands Solvent: tetrahydrofuran (THF)

Flow velocity: 1.0 mL/min

Column temperature: 23° C.

Injection amount: 0.02 mL

Sample preparation: Under shielding light, the sample was diluted with THF so as to have a concentration of 3% by mass and was filtered through a filter having an average pore diameter of 0.45 μm. The resultant sample was used as a measurement sample.

(Synthesis Example 1 of Resin)

<Synthesis of Resin 1>

Into an autoclave reaction tank equipped with a thermometer and a stirrer, xylene (480 parts by mass) and low-molecular polyethylene (product name: SANWAX 151P, available from Sanyo Chemical Industries, Ltd.) (1,000 parts by mass) were charged and were dissolved. Then, to the resultant mixture, a mixture solution of styrene (105 parts by mass), acrylonitrile (10 parts by mass), butyl acrylate (5 parts by mass), di-t-butyl peroxide (4 parts by mass), and xylene (50 parts by mass) was added dropwise at 170° C. for 3 hours and the resultant was allowed to polymerize. Moreover, this temperature was retained for 30 minutes. Next, the solvent was removed to obtain resin 1. The obtained resin 1 was found to have a weight average molecular weight of 6,500. The obtained resin 1 was subjected to structural analysis by using pyrolysis-gas chromatography-mass spectroscopy (Py-GCMS) method under the following analysis conditions, and it could be confirmed that the obtained resin 1 had no ethylenically-unsaturated double bond. In addition, a structure of the resin 1 can be analyzed even through $^1$H NMR.

-Analysis Conditions-

Device: QP2010, available from SHIMADZU CORPORATION

MJT-2020D, available from Frontier Laboratories Ltd.

Thermal decomposition temperature: 350° C.

Column: ULTRA ALLOY-5, L=30 m, I.D=0.25 mm, Film=0.25 μm

Column temperature: from 40° C. (retention time: 2 minutes) through 80° C. (heating: 5° C./min) through 320° C. (retention time: 7 minutes)

Split ratio: 1:100

Column flow rate: 1.01 mL/min

Ionization method: EI method (70 eV)

Measurement mode: Scan mode (Synthesis Example 2 of Resin)

<Synthesis of Resin 2>

Into an autoclave reaction tank equipped with a thermometer and a stirrer, xylene (200 parts by mass), low-molecular polypropylene (product name: VISCOL 440P, available from Sanyo Chemical Industries, Ltd.) (160 parts by mass), and low-molecular polyethylene (product name: SANWAX LEL-400, available from Sanyo Chemical Industries, Ltd.) (40 parts by mass) were charged and were dissolved. Then, the resultant mixture was heated to 175° C. At this temperature, to the resultant mixture, a mixture solution of styrene (660 parts by mass), acrylonitrile (60 parts by mass), monobutyl maleate (80 parts by mass), di-t-butyl peroxy hexahydro terephthalate (26 parts by mass), and xylene (152 parts by mass) was added dropwise for 3 hours and the resultant was allowed to polymerize. Moreover, this temperature was retained for 30 minutes. Next, the solvent was removed to obtain resin 2. The obtained resin 2 was found to have a weight average molecular weight of 10,900. The obtained resin 2 was subjected to structural analysis in the same manner as in the structural analysis of the resin 1, and it could be confirmed that the obtained resin 2 had no ethylenically-unsaturated double bond.

(Synthesis Example 3 of Resin)

<Synthesis of Resin 3>

Into an autoclave reaction tank equipped with a thermometer and a stirrer, xylene (480 parts by mass) and low-molecular polyethylene (product name: SANWAX 151P, available from Sanyo Chemical Industries, Ltd.) (30 parts by mass) were charged and were dissolved. Then, to the resultant mixture, a mixture solution of styrene (880 parts by mass), acrylonitrile (45 parts by mass), butyl acrylate (45 parts by mass), di-t-butyl peroxide (26 parts by mass), and xylene (100 parts by mass) was added dropwise for 170° C. for 3 hours and the resultant was allowed to polymerize. Moreover, this temperature was retained for 30 minutes. Next, the solvent was removed to obtain resin 3. The obtained resin 3 was found to have a weight average molecular weight of 16,000. The obtained resin 3 was subjected to structural analysis in the same manner as in the structural analysis of the resin 1, and it could be confirmed that the obtained resin 3 had no ethylenically-unsaturated double bond.

(Synthesis Example 4 of Resin)
<Synthesis of Resin 4>

Into an autoclave reaction tank equipped with a thermometer and a stirrer, xylene (480 parts by mass) and low-molecular polyethylene (product name: SANWAX 151P, available from Sanyo Chemical Industries, Ltd.) (100 parts by mass) were charged and were dissolved. Then, to the resultant mixture, a mixture solution of styrene (805 parts by mass), acrylonitrile (50 parts by mass), butyl acrylate (45 parts by mass), di-t-butyl peroxide (56 parts by mass), and xylene (100 parts by mass) was added dropwise at 170° C. for 4 hours and the resultant was allowed to polymerize. Moreover, this temperature was retained for 30 minutes. Next, the solvent was removed to obtain resin 4. The obtained resin 4 was found to have a weight average molecular weight of 25,000. The obtained resin 4 was subjected to structural analysis in the same manner as in the structural analysis of the resin 1, and it could be confirmed that the obtained resin 4 had no ethylenically-unsaturated double bond.

(Synthesis Example 5 of Resin)
<Synthesis of Resin 5>

Into an autoclave reaction tank equipped with a thermometer and a stirrer, xylene (480 parts by mass) and low-molecular polyethylene (product name: SANWAX 151P, available from Sanyo Chemical Industries, Ltd.) (100 parts by mass) were charged and were dissolved. Then, to the resultant mixture, a mixture solution of styrene (805 parts by mass), acrylonitrile (50 parts by mass), butyl acrylate (45 parts by mass), di-t-butyl peroxide (24 parts by mass), and xylene (100 parts by mass) was added dropwise at 160° C. for 2 hours and the resultant was allowed to polymerize. Moreover, this temperature was retained for 20 minutes. Next, the solvent was removed to obtain resin 5. The obtained resin 5 was found to have a weight average molecular weight of 5,000. The obtained resin 5 was subjected to structural analysis in the same manner as in the structural analysis of the resin 1, and it could be confirmed that the obtained resin 5 had no ethylenically-unsaturated double bond.

(Synthesis Example 6 of Resin)
<Synthesis of Resin 6>

Into an autoclave reaction tank equipped with a thermometer and a stirrer, xylene (480 parts by mass) and low-molecular polyethylene (product name: SANWAX 151P, available from Sanyo Chemical Industries, Ltd.) (100 parts by mass) were charged and were dissolved. Then, to the resultant mixture, a mixture solution of styrene (805 parts by mass), acrylonitrile (50 parts by mass), butyl acrylate (45 parts by mass), di-t-butyl peroxide (56 parts by mass), and xylene (100 parts by mass) was added dropwise at 180° C. for 6 hours and the resultant was allowed to polymerize. Moreover, this temperature was retained for 30 minutes. Next, the solvent was removed to obtain resin 6. The obtained resin 6 was found to have a weight average molecular weight of 35,000. The obtained resin 6 was subjected to structural analysis in the same manner as in the structural analysis of the resin 1, and it could be confirmed that the obtained resin 6 had no ethylenically-unsaturated double bond.

(Synthesis Example 7 of Resin)
<Synthesis of Resin 7>

A flask (1 L) equipped with a condenser tube, a stirrer, a gas introducing tube, and a thermometer was charged with ion-exchanged water (100 parts by mass) and propylene glycol monomethyl ether (5 parts by mass) and the resultant mixture was stirred. To the aforementioned mixture, a monomer mixture of styrene (60 parts by mass) and acrylic acid-n-butyl (5 parts by mass), di-t-butyl peroxide (1 part by mass) serving as a polymerization initiator, divinylbenzene (0.3 parts by mass) serving as a cross-linking agent, and sodium dodecylbenzenesulfonate (1 part by mass) were added dropwise under stirring. The resultant mixture was heated to 90° C. and was allowed to react for 12 hours. The obtained polymerized product was washed with water and then cooled to 10° C. in an ice bath. Then, the polymerized product was filtrated using a KIRIYAMA filter paper (No. 5C, available from Kiriyama glass Co) and the filtrate was dried at normal temperature and 10 torr to obtain resin 7. The obtained resin 7 was found to have a weight average molecular weight of 40,000. The obtained resin 7 was subjected to structural analysis in the same manner as in the structural analysis of the resin 1, and it could be confirmed that the obtained resin 7 had no ethylenically-unsaturated double bond.

(Synthesis Example 8 of Resin)
<Synthesis of Resin 8>

A flask equipped with a Hempel distilling tube, a thermometer, and a nitrogen introducing tube was charged with diphenyl carbonate (200 parts by mass) and 1,6-hexanediol (200 parts by mass). Under a nitrogen gas atmosphere, the inside of the flask was adjusted to 150° C. and a degree of the reduced pressure of 200 torr, followed by reflux for 30 minutes. Next, the degree of the reduced pressure was increased to 100 torr, and the resultant mixture was heated for 30 minutes. The degree of the reduced pressure was further increased to 5 torr and 1,6-hexanediol was removed to obtain polycarbonate polyol. Next, isophorone diisocyanate (35 parts by mass) was added to a mixture of polycarbonate polyol (150 parts by mass) and 1,3-butanediol (2 parts by mass) and then the resultant mixture was allowed to react for 2 hours at room temperature. Then, isophoronediamine (12 parts by mass) was gradually added dropwise to the resultant mixture to obtain resin 8. The obtained resin 8 was found to have a weight average molecular weight of 40,000. The obtained resin 8 was subjected to structural analysis in the same manner as in the structural analysis of the resin 1, and it could be confirmed that the obtained resin 8 had no ethylenically-unsaturated double bond.

(Synthesis Example 9 of Resin)
<Synthesis of Resin 9>

A reaction container equipped with a condenser tube, a stirrer, and a nitrogen introducing tube was charged with bisphenol A propylene oxide 2 mole adduct (450 parts by mass), bisphenol A propylene oxide 3 mole adduct (280 parts by mass), terephthalic acid (257 parts by mass), isophthalic acid (65 parts by mass), maleic anhydride (10 parts by mass), and titanium dihydroxybis(triethanolaminato) (2 parts by mass) serving as a condensation catalyst. The resultant mixture was allowed to react for 10 hours while water generated was removed under a nitrogen stream at 220° C. Next, the resultant mixture was allowed to react under the reduced pressure of 5 mmHg or more but 20 mmHg or less, and was taken out at a time when the acid value reached 8 mg KOH/g. The resultant mixture was cooled to room temperature and was pulverized to obtain resin 9. The obtained resin 9 was found to have a weight average molecular weight of 27,600. The obtained resin 9 was subjected to structural analysis in the same manner as in the structural analysis of the resin 1, and it could be confirmed that the obtained resin 9 had no ethylenically-unsaturated double bond. In addition, the acid value was measured according to the method described in JIS K0070-1992.

(Preparation Example of Cyan Pigment Dispersion)
<Preparation of Cyan Pigment Dispersion>

A cyan pigment (phthalocyanine blue, available from SANYO COLOR WORKS, Ltd.) (300 parts by mass) and dispersant polymer (product name: S32000, available from The Lubrizol Corporation) (100 parts by mass) were mixed at a mass ratio (cyan pigment/dispersant polymer) of 3:1 to obtain a cyan pigment dispersion.

Example 1

Tetrahydrofurfuryl acrylate (THFA, available from Osaka Organic Chemical Industry Ltd.) (25 parts by mass), isobornyl acrylate (IBXA, available from Osaka Organic Chemical Industry Ltd.) (25 parts by mass), phenoxyethyl acrylate (PEA, available from Osaka Organic Chemical Industry Ltd.) (25 parts by mass), N-vinylcaprolactam (NVC, available from Osaka Organic Chemical Industry Ltd.) (25 parts by mass), the resin 1 (5 parts by mass), hydroxy-cyclohexyl-phenyl-ketone (product name: IRGACURE 184, available from BASF) (7.5 parts by mass), and the cyan pigment dispersion (5 parts by mass) were stirred for 1 hour, and it was confirmed that there was not any material that remained undissolved. Then, the resultant solution was filtrated through a membrane filter having an average pore diameter of 5 μm and being made of a fluororesin, and coarse particles causing head clogging were removed to obtain active-energy-ray-curable composition 1.

Example 2

Active-energy-ray-curable composition 2 was obtained in the same manner as in Example 1 except that the resin 1 (5 parts by mass) was changed to the resin 2 (5 parts by mass).

Example 3

Active-energy-ray-curable composition 3 was obtained in the same manner as in Example 1 except that the resin 1 (5 parts by mass) was changed to the resin 3 (5 parts by mass).

Example 4

Active-energy-ray-curable composition 4 was obtained in the same manner as in Example 3 except that hydroxy-cyclohexyl-phenyl-ketone (product name: IRGACURE 184, available from BASF) (7.5 parts by mass) was changed to hydroxy-cyclohexyl-phenyl-ketone (product name: IRGACURE 184, available from BASF) (2.5 parts by mass) and 2-hydroxy-1-{4-[4-(2-hydroxy-2-methyl-propionyl)-benzyl]phenyl}-2-methyl-propan-1-one (product name: IRGACURE 127, available from BASF) (5 parts by mass).

Example 5

Active-energy-ray-curable composition 5 was obtained in the same manner as in Example 1 except that the resin 1 (5 parts by mass) was changed to the resin 4 (5 parts by mass).

Example 6

Active-energy-ray-curable composition 6 was obtained in the same manner as in Example 1 except that the resin 1 (5 parts by mass) was changed to urethane methacrylate (oligomer, product name: MIRAMER SIU 100, available from TOYO CHEMICALS CO., LTD, weight average molecular weight: 6,500) (5 parts by mass).

Example 7

Active-energy-ray-curable composition 7 was obtained in the same manner as in Example 1 except that tetrahydrofurfuryl acrylate (THFA, available from Osaka Organic Chemical Industry Ltd.) (25 parts by mass), isobornyl acrylate (IBXA, available from Osaka Organic Chemical Industry Ltd.) (25 parts by mass), phenoxyethyl acrylate (PEA, available from Osaka Organic Chemical Industry Ltd.) (25 parts by mass), and N-vinylcaprolactam (NVC, available from Osaka Organic Chemical Industry Ltd.) (25 parts by mass) were changed to isobornyl acrylate (IBXA, available from Osaka Organic Chemical Industry Ltd.) (40 parts by mass), N-vinylcaprolactam (NVC, available from Osaka Organic Chemical Industry Ltd.) (40 parts by mass), and 1-adamantyl acrylate (1-AdA, available from Osaka Organic Chemical Industry Ltd.) (20 parts by mass).

Example 8

Active-energy-ray-curable composition 8 was obtained in the same manner as in Example 7 except that the resin 1 (5 parts by mass) was changed to the resin 2 (5 parts by mass).

Example 9

Active-energy-ray-curable composition 9 was obtained in the same manner as in Example 7 except that the resin 1 (5 parts by mass) was changed to the resin 3 (5 parts by mass).

Example 10

Active-energy-ray-curable composition 10 was obtained in the same manner as in Example 9 except that hydroxy-cyclohexyl-phenyl-ketone (product name: IRGACURE 184, available from BASF) (7.5 parts by mass) was changed to hydroxy-cyclohexyl-phenyl-ketone (product name: IRGACURE 184, available from BASF) (2.5 parts by mass) and 2-hydroxy-1-{4-[4-(2-hydroxy-2-methyl-propionyl)-benzyl]phenyl}-2-methyl-propan-1-one (product name: IRGACURE 127, available from BASF) (5 parts by mass).

Example 11

Active-energy-ray-curable composition 11 was obtained in the same manner as in Example 7 except that the resin 1 (5 parts by mass) was changed to the resin 4 (5 parts by mass).

Example 12

Active-energy-ray-curable composition 12 was obtained in the same manner as in Example 1 except that tetrahydrofurfuryl acrylate (THFA, available from Osaka Organic Chemical Industry Ltd.) (25 parts by mass), isobornyl acrylate (IBXA, available from Osaka Organic Chemical Industry Ltd.) (25 parts by mass), phenoxyethyl acrylate (PEA, available from Osaka Organic Chemical Industry Ltd.) (25 parts by mass), and N-vinylcaprolactam (NVC, available from Osaka Organic Chemical Industry Ltd.) (25 parts by mass) were changed to isobornyl acrylate (IBXA, available from Osaka Organic Chemical Industry Ltd.) (25 parts by mass), phenoxyethyl acrylate (PEA, available from Osaka Organic Chemical Industry Ltd.) (25 parts by mass), and N-vinylcaprolactam (NVC, available from Osaka Organic Chemical Industry Ltd.) (50 parts by mass); and the resin 1 (5 parts by mass) was changed to ethoxylated bisphenol A diacrylate (oligomer, available from Shin Nakamura Chemical Co., Ltd., weight average molecular weight: 1,216) (5 parts by mass).

Example 13

Active-energy-ray-curable composition 13 was obtained in the same manner as in Example 12 except that ethoxylated bisphenol A diacrylate (5 parts by mass) was changed to urethane acrylate (oligomer, product name: U-200PA, available from Shin Nakamura Chemical Co., Ltd., weight average molecular weight: 2,700) (5 parts by mass).

Example 14

Active-energy-ray-curable composition 14 was obtained in the same manner as in Example 12 except that ethoxylated bisphenol A diacrylate (5 parts by mass) was changed to ester-based urethane acrylate (product name: UX-5005, available from Nippon Kayaku Co., Ltd., weight average molecular weight: 4,500) (5 parts by mass); and hydroxy-cyclohexyl-phenyl-ketone (product name: IRGACURE 184, available from BASF) (7.5 parts by mass) was changed to hydroxy-cyclohexyl-phenyl-ketone (product name: IRGACURE 184, available from BASF) (2.5 parts by mass) and 2-hydroxy-1-{4-[4-(2-hydroxy-2-methyl-propionyl)-benzyl]phenyl}-2-methyl-propan-1-one (product name: IRGACURE 127, available from BASF) (5 parts by mass).

Example 15

Active-energy-ray-curable composition 15 was obtained in the same manner as in Example 14 except that hydroxy-cyclohexyl-phenyl-ketone (2.5 parts by mass) and 2-hydroxy-1-{4-[4-(2-hydroxy-2-methyl-propionyl)-benzyl]phenyl}-2-methyl-propan-1-one (5 parts by mass) were changed to hydroxy-cyclohexyl-phenyl-ketone (product name: IRGACURE 184, available from BASF) (7.5 parts by mass).

Example 16

Active-energy-ray-curable composition 16 was obtained in the same manner as in Example 12 except that ethoxylated bisphenol A diacrylate (5 parts by mass) was changed to urethane methacrylate (oligomer, product name: MIRAMER SIU100, available from TOYO CHEMICALS CO., LTD, weight average molecular weight: 6,500) (5 parts by mass).

Example 17

Active-energy-ray-curable composition 17 was obtained in the same manner as in Example 12 except that ethoxylated bisphenol A diacrylate (5 parts by mass) was changed to the resin 1 (5 parts by mass).

Example 18

Active-energy-ray-curable composition 18 was obtained in the same manner as in Example 12 except that isobornyl acrylate (IBXA, available from Osaka Organic Chemical Industry Ltd.) (25 parts by mass), phenoxyethyl acrylate (PEA, available from Osaka Organic Chemical Industry Ltd.) (25 parts by mass), and N-vinylcaprolactam (NVC, available from Osaka Organic Chemical Industry Ltd.) (50 parts by mass) were changed to tetrahydrofurfuryl acrylate (THFA, available from Osaka Organic Chemical Industry Ltd.) (40 parts by mass), isobornyl acrylate (IBXA, available from Osaka Organic Chemical Industry Ltd.) (40 parts by mass), N-vinylcaprolactam (NVC, available from Osaka Organic Chemical Industry Ltd.) (10 parts by mass), and acryloyl morpholine (ACMO, available from KJ Chemicals Corporation) (10 parts by mass).

Example 19

Active-energy-ray-curable composition 19 was obtained in the same manner as in Example 18 except that ethoxylated bisphenol A diacrylate (5 parts by mass) was changed to urethane acrylate (oligomer, product name: U-200PA, available from Shin Nakamura Chemical Co., Ltd., weight average molecular weight: 2,700) (5 parts by mass).

Example 20

Active-energy-ray-curable composition 20 was obtained in the same manner as in Example 18 except that ethoxylated bisphenol A diacrylate (5 parts by mass) was changed to ester-based urethane acrylate (product name: UX-5005, available from Nippon Kayaku Co., Ltd., weight average molecular weight: 4,500) (5 parts by mass); and hydroxy-cyclohexyl-phenyl-ketone (product name: IRGACURE 184, available from BASF) (7.5 parts by mass) was changed to hydroxy-cyclohexyl-phenyl-ketone (product name: IRGACURE 184, available from BASF) (2.5 parts by mass) and 2-hydroxy-1-{4-[4-(2-hydroxy-2-methyl-propionyl)-benzyl]phenyl}-2-methyl-propan-1-one (product name: IRGACURE 127, available from BASF) (5 parts by mass).

Example 21

Active-energy-ray-curable composition 21 was obtained in the same manner as in Example 20 except that hydroxy-cyclohexyl-phenyl-ketone (2.5 parts by mass) and 2-hydroxy-1-{4-[4-(2-hydroxy-2-methyl-propionyl)-benzyl]phenyl}-2-methyl-propan-1-one (5 parts by mass) were changed to hydroxy-cyclohexyl-phenyl-ketone (product name: IRGACURE 184, available from BASF) (7.5 parts by mass).

Example 22

Active-energy-ray-curable composition 22 was obtained in the same manner as in Example 18 except that ethoxylated bisphenol A diacrylate (5 parts by mass) was changed to urethane methacrylate (oligomer, product name: MIRAMER SIU100, available from TOYO CHEMICALS CO., LTD, weight average molecular weight: 6,500) (5 parts by mass).

Example 23

Phenoxyethyl acrylate (PEA, available from Osaka Organic Chemical Industry Ltd.) (25 parts by mass), isooctyl acrylate (IOA, available from Osaka Organic Chemical Industry Ltd.) (20 parts by mass), stearyl acrylate (STA, available from Osaka Organic Chemical Industry Ltd.) (50 parts by mass), 1,6-hexanediol diacrylate (multifunctional monomer, product name: A-HD-N, available from Shin Nakamura Chemical Co., Ltd.) (5 parts by mass), silica particles 1 (available from COREFRONT Corporation, average primary particle diameter: 70 nm) (1.5 parts by mass), hydroxy-cyclohexyl-phenyl-ketone (product name: IRGACURE 184, available from BASF) (7.5 parts by mass), and the cyan pigment dispersion (5 parts by mass) were stirred for 1 hour, and it was confirmed that there was not any material that remained undissolved. Then, the resultant solution was filtrated through a membrane filter having an average pore diameter of 5 µm and being made of a fluororesin, and coarse particles causing head clogging were removed to obtain active-energy-ray-curable composition 23.

Example 24

Active-energy-ray-curable composition 24 was obtained in the same manner as in Example 23 except that the silica particles 1 (available from COREFRONT Corporation, average primary particle diameter: 70 nm) (1.5 parts by mass) were changed to the silica particles 2 (available from COREFRONT Corporation, average primary particle diameter: 50 nm) (1.5 parts by mass).

Example 25

Active-energy-ray-curable composition 25 was obtained in the same manner as in Example 24 except that hydroxy-cyclohexyl-phenyl-ketone (product name: IRGACURE 184, available from BASF) (7.5 parts by mass) was changed to hydroxy-cyclohexyl-phenyl-ketone (product name: IRGACURE 184, available from BASF) (2.5 parts by mass) and 2-hydroxy-1-{4-[4-(2-hydroxy-2-methyl-propionyl)-benzyl]phenyl}-2-methyl-propan-1-one (product name: IRGACURE 127, available from BASF) (5 parts by mass).

Example 26

Active-energy-ray-curable composition 26 was obtained in the same manner as in Example 23 except that the silica particles 1 (available from COREFRONT Corporation, average primary particle diameter: 70 nm) (1.5 parts by mass) were changed to the silica particles 3 (available from COREFRONT Corporation, average primary particle diameter: 30 nm) (1.5 parts by mass).

Example 27

Active-energy-ray-curable composition 27 was obtained in the same manner as in Example 24 except that an amount of the silica particles 2 (available from COREFRONT Corporation, average primary particle diameter: 50 nm) was changed from 1.5 parts by mass to 1.0 part by mass.

Example 28

Active-energy-ray-curable composition 28 was obtained in the same manner as in Example 24 except that the amount of the silica particles 2 (available from COREFRONT Corporation, average primary particle diameter: 50 nm) was changed from 1.5 parts by mass to 2.0 parts by mass.

Example 29

Active-energy-ray-curable composition 29 was obtained in the same manner as in Example 23 except that phenoxy-ethyl acrylate (PEA, available from Osaka Organic Chemical Industry Ltd.) (25 parts by mass), isooctyl acrylate (IOA, available from Osaka Organic Chemical Industry Ltd.) (20 parts by mass), and stearyl acrylate (STA, available from Osaka Organic Chemical Industry Ltd.) (50 parts by mass) were changed to isobornyl acrylate (IBXA, available from Osaka Organic Chemical Industry Ltd.) (50 parts by mass), 1-adamantyl acrylate (1-AdA, available from Osaka Organic Chemical Industry Ltd.) (30 parts by mass), ethyl acrylate (EA, available from Mitsubishi Chemical Corporation) (10 parts by mass), and acryloyl morpholine (ACMO, available from KJ Chemicals Corporation) (10 parts by mass); and 1,6-hexanediol diacrylate (multifunctional monomer, product name: A-HD-N, available from Shin Nakamura Chemical Co., Ltd.) (5 parts by mass) was not contained.

Example 30

Active-energy-ray-curable composition 30 was obtained in the same manner as in Example 29 except that the silica particles 1 (available from COREFRONT Corporation, average primary particle diameter: 70 nm) (1.5 parts by mass) were changed to the silica particles 2 (available from COREFRONT Corporation, average primary particle diameter: 50 nm) (1.5 parts by mass).

Example 31

Active-energy-ray-curable composition 31 was obtained in the same manner as in Example 30 except that hydroxy-cyclohexyl-phenyl-ketone (product name: IRGACURE 184, available from BASF) (7.5 parts by mass) was changed to hydroxy-cyclohexyl-phenyl-ketone (product name: IRGACURE 184, available from BASF) (2.5 parts by mass) and 2-hydroxy-1-{4-[4-(2-hydroxy-2-methyl-propionyl)-benzyl]phenyl}-2-methyl-propan-1-one (product name: IRGACURE 127, available from BASF) (5 parts by mass).

Example 32

Active-energy-ray-curable composition 32 was obtained in the same manner as in Example 29 except that the silica particles 1 (available from COREFRONT Corporation, average primary particle diameter: 70 nm) (1.5 parts by mass) were changed to the silica particles 3 (available from COREFRONT Corporation, average primary particle diameter: 30 nm) (1.5 parts by mass).

Example 33

Active-energy-ray-curable composition 33 was obtained in the same manner as in Example 30 except that the amount of the silica particles 2 (available from COREFRONT Corporation, average primary particle diameter: 50 nm) was changed from 1.5 parts by mass to 1.0 part by mass.

Example 34

Active-energy-ray-curable composition 34 was obtained in the same manner as in Example 30 except that the amount of the silica particles 2 (available from COREFRONT Corporation, average primary particle diameter: 50 nm) was changed from 1.5 parts by mass to 2.0 parts by mass.

Comparative Example 1

Active-energy-ray-curable composition 35 was obtained in the same manner as in Example 1 except that tetrahydrofurfuryl acrylate (THFA, available from Osaka Organic Chemical Industry Ltd.) (25 parts by mass), isobornyl acrylate (IBXA, available from Osaka Organic Chemical Industry Ltd.) (25 parts by mass), phenoxyethyl acrylate (PEA, available from Osaka Organic Chemical Industry Ltd.) (25 parts by mass), and N-vinylcaprolactam (NVC, available from Osaka Organic Chemical Industry Ltd.) (25 parts by mass) were changed to 1,6-hexanediol diacrylate (multi-functional monomer, product name: A-HD-N, available from Shin Nakamura Chemical Co., Ltd.) (100 parts by mass).

Comparative Example 2

Active-energy-ray-curable composition 36 was obtained in the same manner as in Example 1 except that the resin 1 (5 parts by mass) was changed to the resin 5 (5 parts by mass).

Comparative Example 3

Active-energy-ray-curable composition 37 was obtained in the same manner as in Example 1 except that the resin 1 (5 parts by mass) was changed to the resin 6 (5 parts by mass).

Comparative Example 4

Active-energy-ray-curable composition 38 was obtained in the same manner as in Example 1 except that the resin 1 (5 parts by mass) was not contained.

Comparative Example 5

Active-energy-ray-curable composition 39 was obtained in the same manner as in Example 1 except that the resin 1 (5 parts by mass) was changed to polyethylene glycol #400 dimethacrylate (oligomer, product name: 9G, available from Shin Nakamura Chemical Co., Ltd., weight average molecular weight: 536) (5 parts by mass).

Comparative Example 6

Active-energy-ray-curable composition 40 was obtained in the same manner as in Example 7 except that the resin 1 (5 parts by mass) was resin 5 (5 parts by mass).

Comparative Example 7

Active-energy-ray-curable composition 41 was obtained in the same manner as in Example 7 except that the resin 1 (5 parts by mass) was changed to the resin 6 (5 parts by mass).

Comparative Example 8

Active-energy-ray-curable composition 42 was obtained in the same manner as in Example 12 except that ethoxylated bisphenol A diacrylate (oligomer, available from Shin Nakamura Chemical Co., Ltd., weight average molecular weight: 1,216) (5 parts by mass) was changed to polyethylene glycol #400 dimethacrylate (oligomer, product name: 9G, available from Shin Nakamura Chemical Co., Ltd., weight average molecular weight: 536) (5 parts by mass).

Comparative Example 9

Active-energy-ray-curable composition 43 was obtained in the same manner as in Example 12 except that ethoxylated bisphenol A diacrylate (oligomer, available from Shin Nakamura Chemical Co., Ltd., weight average molecular weight: 1,216) (5 parts by mass) was changed to composite urethane acrylate (oligomer, product name: UX-7101, available from Nippon Kayaku Co., Ltd., weight average molecular weight: 8,500) (5 parts by mass).

Comparative Example 10

Active-energy-ray-curable composition 44 was obtained in the same manner as in Example 12 except that ethoxylated bisphenol A diacrylate (oligomer, available from Shin Nakamura Chemical Co., Ltd., weight average molecular weight: 1,216) (5 parts by mass) was not contained.

Comparative Example 11

Active-energy-ray-curable composition 45 was obtained in the same manner as in Example 12 except that ethoxylated bisphenol A diacrylate (oligomer, available from Shin Nakamura Chemical Co., Ltd., weight average molecular weight: 1,216) (5 parts by mass) was changed to the resin 6 (5 parts by mass).

Comparative Example 12

Active-energy-ray-curable composition 46 was obtained in the same manner as in Example 18 except that ethoxylated bisphenol A diacrylate (oligomer, available from Shin Nakamura Chemical Co., Ltd., weight average molecular weight: 1,216) (5 parts by mass) was changed to polyethylene glycol #400 dimethacrylate (oligomer, product name: 9G, available from Shin Nakamura Chemical Co., Ltd., weight average molecular weight: 536) (5 parts by mass).

Comparative Example 13

Active-energy-ray-curable composition 47 was obtained in the same manner as in Example 18 except that ethoxylated bisphenol A diacrylate (oligomer, available from Shin Nakamura Chemical Co., Ltd., weight average molecular weight: 1,216) (5 parts by mass) was changed to composite urethane acrylate (oligomer, product name: UX-7101, available from Nippon Kayaku Co., Ltd., weight average molecular weight: 8,500) (5 parts by mass).

Comparative Example 14

Active-energy-ray-curable composition 48 was obtained in the same manner as in Example 23 except that the silica particles 1 (available from COREFRONT Corporation, average primary particle diameter: 70 nm) (1.5 parts by mass) were changed to the silica particles 4 (available from COREFRONT Corporation, average primary particle diameter: 100 nm) (1.5 parts by mass).

Comparative Example 15

Active-energy-ray-curable composition 49 was obtained in the same manner as in Example 23 except that the silica particles 1 (available from COREFRONT Corporation, average primary particle diameter: 70 nm) (1.5 parts by mass) were changed to the silica particles 5 (available from COREFRONT Corporation, average primary particle diameter: 10 nm) (1.5 parts by mass).

Comparative Example 16

Active-energy-ray-curable composition 50 was obtained in the same manner as in Example 23 except that the silica particles 1 (available from COREFRONT Corporation, average primary particle diameter: 70 nm) (1.5 parts by mass) were changed to the silica particles 2 (available from COREFRONT Corporation, average primary particle diameter: 50 nm) (0.3 parts by mass).

Comparative Example 17

Active-energy-ray-curable composition 51 was obtained in the same manner as in Example 23 except that the silica particles 1 (available from COREFRONT Corporation, average primary particle diameter: 70 nm) (1.5 parts by mass) were changed to the silica particles 2 (available from COREFRONT Corporation, average primary particle diameter: 50 nm) (4.0 parts by mass).

Comparative Example 18

Active-energy-ray-curable composition 52 was obtained in the same manner as in Example 23 except that the silica particles 1 (available from COREFRONT Corporation, average primary particle diameter: 70 nm) (1.5 parts by mass) were not contained.

Comparative Example 19

Active-energy-ray-curable composition 53 was obtained in the same manner as in Example 29 except that the silica particles 1 (available from COREFRONT Corporation, average primary particle diameter: 70 nm) (1.5 parts by mass) were changed to the silica particles 4 (available from COREFRONT Corporation, average primary particle diameter: 100 nm) (1.5 parts by mass).

Comparative Example 20

Active-energy-ray-curable composition 54 was obtained in the same manner as in Example 29 except that the silica particles 1 (available from COREFRONT Corporation, average primary particle diameter: 70 nm) (1.5 parts by mass) were changed to the silica particles 5 (available from COREFRONT Corporation, average primary particle diameter: 10 nm) (1.5 parts by mass).

Comparative Example 21

Active-energy-ray-curable composition 55 was obtained in the same manner as in Example 29 except that the silica particles 1 (available from COREFRONT Corporation, average primary particle diameter: 70 nm) (1.5 parts by mass) were changed to the silica particles 2 (available from COREFRONT Corporation, average primary particle diameter: 50 nm) (0.3 parts by mass).

Comparative Example 22

Active-energy-ray-curable composition 56 was obtained in the same manner as in Example 29 except that the silica particles 1 (available from COREFRONT Corporation, average primary particle diameter: 70 nm) (1.5 parts by mass) were changed to the silica particles 2 (available from COREFRONT Corporation, average primary particle diameter: 50 nm) (4.0 parts by mass).

Comparative Example 23

Tetrahydrofurfuryl acrylate (THFA, available from Osaka Organic Chemical Industry Ltd.) (100 parts by mass), 1,3-butylene glycol diacrylate (product name: SR212, available from Sartomer) (20 parts by mass), the resin 7 (5 parts by mass), polyester-based urethane acrylate oligomer (oligomer, product name: SHIKOH UV-3310B, available from The Nippon Synthetic Chemical Industry Co., Ltd., weight average molecular weight 5,000) (5 parts by mass), hydroxy-cyclohexyl-phenyl-ketone (product name: IRGACURE 184, available from BASF) (2.5 parts by mass), 2-hydroxy-1-{4-[4-(2-hydroxy-2-methyl-propionyl)-benzyl]phenyl}-2-methyl-propan-1-one (product name: IRGACURE 127, available from BASF) (5 parts by mass), and the cyan pigment dispersion (5 parts by mass) were stirred for 1 hour, and it was confirmed that there was not any material that remained undissolved. Then, the resultant solution was filtrated through a membrane filter having an average pore diameter of 5 μm and being made of a fluororesin, and coarse particles causing head clogging were removed to obtain active-energy-ray-curable composition 57.

Comparative Example 24

Active-energy-ray-curable composition 58 was obtained in the same manner as in Comparative Example 23 except that the resin 7 (5 parts by mass) was changed to the resin 8 (5 parts by mass); hydroxy-cyclohexyl-phenyl-ketone (product name: IRGACURE 184, available from BASF) (2.5 parts by mass) and 2-hydroxy-1-{4-[4-(2-hydroxy-2-methyl-propionyl)-benzyl]phenyl}-2-methyL-propan-1-one (product name: IRGACURE 127, available from BASF) (5 parts by mass) were changed to hydroxy-cyclohexyl-phenyl-ketone (product name: IRGACURE 184, available from BASF) (7.5 parts by mass), 2,4,6-trimethylbenzoyl-diphenyl-phosphine oxide (product name: LUCIRIN TPO, available from BASF) (10.0 parts by mass), and 2,4-diethylthioxanthone (KAYACURE-DETX-S, available from Nippon Kayaku Co., Ltd.) (2.0 parts by mass); and 1,3-butylene glycol diacrylate (product name: SR212, available from Sartomer) (20 parts by mass), polyester-based urethane acrylate oligomer (oligomer, product name: SHIKOH UV-3310B, available from The Nippon Synthetic Chemical Industry Co., Ltd., weight average molecular weight 5,000) (5 parts by mass), and the cyan pigment dispersion (5 parts by mass) were not contained.

Comparative Example 25

Active-energy-ray-curable composition 59 was obtained in the same manner as in Comparative Example 24 except that the resin 8 (5 parts by mass) was changed to the resin 9 (2 parts by mass); and 2,4,6-trimethylbenzoyl-diphenyl-phosphine oxide (product name: LUCIRIN TPO, available from BASF) (10.0 parts by mass) was changed to 2,4,6-trimethylbenzoyl-diphenyl-phosphine oxide (product name: LUCIRIN TPO, available from BASF) (5.0 parts by mass).

The formulations of the obtained active-energy-ray-curable compositions 1 to 59 of Examples 1 to 34 and Comparative Examples 1 to 25 are presented in the following Table 1-1 through Table 10-2.

TABLE 1-1

|  |  | Examples | | |
|---|---|---|---|---|
|  |  | 1 | 2 | 3 |
| Monofunctional monomers | Tetrahydrofurfuryl acrylate | 25 | 25 | 25 |
|  | Isobornyl acrylate | 25 | 25 | 25 |
|  | Phenoxyethyl acrylate | 25 | 25 | 25 |
|  | N-vinylcaprolactam | 25 | 25 | 25 |
|  | 1-Adamantyl acrylate | — | — | — |
|  | Isooctyl acrylate | — | — | — |
|  | Acryloyl morpholine | — | — | — |
|  | Stearyl acrylate | — | — | — |
|  | Ethyl acrylate | — | — | — |
| Multifunctional monomers | 1,6-Hexanediol diacrylate | — | — | — |
|  | 1,3-Butylene glycol diacrylate | — | — | — |
| Oligomers | Urethane methacrylate (weight average molecular weight: 6,500) | — | — | — |
|  | Ethoxylated bisphenol A diacrylate (weight average molecular weight: 1,216) | — | — | — |
|  | Urethane acrylate (weight average molecular weight: 2,700) | — | — | — |
|  | Ester-based urethane acrylate (weight average molecular weight: 4,500) | — | — | — |
|  | Polyethylene glycol #400 dimethacrylate (weight average molecular weight: 536) | — | — | — |
|  | Composite urethane acrylate (weight average molecular weight: 8,500) | — | — | — |
|  | Polyester-based urethane acrylate oligomer (weight average molecular weight: 5,000) | — | — | — |
| Resins | Resin 1 (weight average molecular weight: 6,500) | 5 | — | — |
|  | Resin 2 (weight average molecular weight: 10,900) | — | 5 | — |
|  | Resin 3 (weight average molecular weight: 16,000) | — | — | 5 |
|  | Resin 4 (weight average molecular weight: 25,000) | — | — | — |
|  | Resin 5 (weight average molecular weight: 5,000) | — | — | — |
|  | Resin 6 (weight average molecular weight: 35,000) | — | — | — |
|  | Resin 7 (weight average molecular weight: 40,000) | — | — | — |
|  | Resin 8 (weight average molecular weight: 40,000) | — | — | — |
|  | Resin 9 (weight average molecular weight: 27,600) | — | — | — |
| Silica particles | Silica particles 1 (average primary particle diameter: 70 nm) | — | — | — |
|  | Silica particles 2 (average primary particle diameter: 50 nm) | — | — | — |
|  | Silica particles 3 (average primary particle diameter: 30 nm) | — | — | — |
|  | Silica particles 4 (average primary particle diameter: 10 nm) | — | — | — |
|  | Silica particles 5 (average primary particle diameter: 100 nm) | — | — | — |
| Polymerization initiators | Hydroxy-cyclohexyl-phenyl-ketone | 7.5 | 7.5 | 7.5 |
|  | 2-Hydroxy-1-{4-[4-(2-hydroxy-2-methyl-propionyl)-benzyl]phenyl}-2-methyl-propan-1-one | — | — | — |
|  | 2,4,6-Trimethylbenzoyl-diphenyl-phosphine oxide | — | — | — |
|  | 2,4-Diethylthioxanthone | — | — | — |
| Colorant | Cyan pigment dispersion | 5 | 5 | 5 |
|  | Critical load ($W_1$) (g) | 5.2 | 12.3 | 14.4 |

TABLE 1-2

|  |  | Examples | | |
|---|---|---|---|---|
|  |  | 4 | 5 | 6 |
| Monofunctional monomers | Tetrahydrofurfuryl acrylate | 25 | 25 | 25 |
|  | Isobornyl acrylate | 25 | 25 | 25 |
|  | Phenoxyethyl acrylate | 25 | 25 | 25 |
|  | N-vinylcaprolactam | 25 | 25 | 25 |
|  | 1-Adamantyl acrylate | — | — | — |
|  | Isooctyl acrylate | — | — | — |
|  | Acryloyl morpholine | — | — | — |
|  | Stearyl acrylate | — | — | — |
|  | Ethyl acrylate | — | — | — |
| Multifunctional monomers | 1,6-Hexanediol diacrylate | — | — | — |
|  | 1,3-Butylene glycol diacrylate | — | — | — |
| Oligomers | Urethane methacrylate (weight average molecular weight: 6,500) | — | — | 5 |
|  | Ethoxylated bisphenol A diacrylate (weight average molecular weight: 1,216) | — | — | — |
|  | Urethane acrylate (weight average molecular weight: 2,700) | — | — | — |
|  | Ester-based urethane acrylate (weight average molecular weight: 4,500) | — | — | — |

TABLE 1-2-continued

|  |  | Examples | | |
|---|---|---|---|---|
|  |  | 4 | 5 | 6 |
|  | Polyethylene glycol #400 dimethacrylate (weight average molecular weight: 536) | — | — | — |
|  | Composite urethane acrylate (weight average molecular weight: 8,500) | — | — | — |
|  | Polyester-based urethane acrylate oligomer (weight average molecular weight: 5,000) | — | — | — |
| Resins | Resin 1 (weight average molecular weight: 6,500) | — | — | — |
|  | Resin 2 (weight average molecular weight: 10,900) | — | — | — |
|  | Resin 3 (weight average molecular weight: 16,000) | 5 | — | — |
|  | Resin 4 (weight average molecular weight: 25,000) | — | 5 | — |
|  | Resin 5 (weight average molecular weight: 5,000) | — | — | — |
|  | Resin 6 (weight average molecular weight: 35,000) | — | — | — |
|  | Resin 7 (weight average molecular weight: 40,000) | — | — | — |
|  | Resin 8 (weight average molecular weight: 40,000) | — | — | — |
|  | Resin 9 (weight average molecular weight: 27,600) | — | — | — |
| Silica particles | Silica particles 1 (average primary particle diameter: 70 nm) | — | — | — |
|  | Silica particles 2 (average primary particle diameter: 50 nm) | — | — | — |
|  | Silica particles 3 (average primary particle diameter: 30 nm) | — | — | — |
|  | Silica particles 4 (average primary particle diameter: 10 nm) | — | — | — |
|  | Silica particles 5 (average primary particle diameter: 100 nm) | — | — | — |
| Polymerization initiators | Hydroxy-cyclohexyl-phenyl-ketone | 2.5 | 7.5 | 7.5 |
|  | 2-Hydroxy-1-{4-[4-(2-hydroxy-2-methyl-propionyl)-benzyl]phenyl}-2-methyl-propan-1-one | 5 | — | — |
|  | 2,4,6-Trimethylbenzoyl-diphenyl-phosphine oxide | — | — | — |
|  | 2,4-Diethylthioxanthone | — | — | — |
| Colorant | Cyan pigment dispersion | 5 | 5 | 5 |
|  | Critical load ($W_1$) (g) | 17.3 | 22.3 | 22.4 |

TABLE 2-1

|  |  | Examples | | |
|---|---|---|---|---|
|  |  | 7 | 8 | 9 |
| Monofunctional monomers | Tetrahydrofurfuryl acrylate | — | — | — |
|  | Isobornyl acrylate | 40 | 40 | 40 |
|  | Phenoxyethyl acrylate | — | — | — |
|  | N-vinylcaprolactam | 40 | 40 | 40 |
|  | 1-Adamantyl acrylate | 20 | 20 | 20 |
|  | Isooctyl acrylate | — | — | — |
|  | Acryloyl morpholine | — | — | — |
|  | Stearyl acrylate | — | — | — |
|  | Ethyl acrylate | — | — | — |
| Multifunctional monomers | 1,6-Hexanediol diacrylate | — | — | — |
|  | 1,3-Butylene glycol diacrylate | — | — | — |
| Oligomers | Urethane methacrylate (weight average molecular weight: 6,500) | — | — | — |
|  | Ethoxylated bisphenol A diacrylate (weight average molecular weight: 1,216) | — | — | — |
|  | Urethane acrylate (weight average molecular weight: 2,700) | — | — | — |
|  | Ester-based urethane acrylate (weight average molecular weight: 4,500) | — | — | — |
|  | Polyethylene glycol #400 dimethacrylate (weight average molecular weight: 536) | — | — | — |
|  | Composite urethane acrylate (weight average molecular weight: 8,500) | — | — | — |
|  | Polyester-based urethane acrylate oligomer (weight average molecular weight: 5,000) | — | — | — |
| Resins | Resin 1 (weight average molecular weight: 6,500) | 5 | — | — |
|  | Resin 2 (weight average molecular weight: 10,900) | — | 5 | — |
|  | Resin 3 (weight average molecular weight: 16,000) | — | — | 5 |
|  | Resin 4 (weight average molecular weight: 25,000) | — | — | — |
|  | Resin 5 (weight average molecular weight: 5,000) | — | — | — |
|  | Resin 6 (weight average molecular weight: 35,000) | — | — | — |
|  | Resin 7 (weight average molecular weight: 40,000) | — | — | — |
|  | Resin 8 (weight average molecular weight: 40,000) | — | — | — |
|  | Resin 9 (weight average molecular weight: 27,600) | — | — | — |
| Silica particles | Silica particles 1 (average primary particle diameter: 70 nm) | — | — | — |
|  | Silica particles 2 (average primary particle diameter: 50 nm) | — | — | — |
|  | Silica particles 3 (average primary particle diameter: 30 nm) | — | — | — |
|  | Silica particles 4 (average primary particle diameter: 10 nm) | — | — | — |
|  | Silica particles 5 (average primary particle diameter: 100 nm) | — | — | — |

TABLE 2-1-continued

|  |  | Examples | | |
|---|---|---|---|---|
|  |  | 7 | 8 | 9 |
| Polymerization initiators | Hydroxy-cyclohexyl-phenyl-ketone | 7.5 | 7.5 | 7.5 |
|  | 2-Hydroxy-1-{4-[4-(2-hydroxy-2-methyl-propionyl)-benzyl]phenyl}-2-methyl-propan-1-one | — | — | — |
|  | 2,4,6-Trimethylbenzoyl-diphenyl-phosphine oxide | — | — | — |
|  | 2,4-Diethylthioxanthone | — | — | — |
| Colorant | Cyan pigment dispersion | 5 | 5 | 5 |
|  | Critical load ($W_1$) (g) | 8.4 | 14.2 | 14.8 |

TABLE 2-2

|  |  | Examples | | |
|---|---|---|---|---|
|  |  | 10 | 11 | 12 |
| Monofunctional monomers | Tetrahydrofurfuryl acrylate | — | — | — |
|  | Isobornyl acrylate | 40 | 40 | 25 |
|  | Phenoxyethyl acrylate | — | — | 25 |
|  | N-vinylcaprolactam | 40 | 40 | 50 |
|  | 1-Adamantyl acrylate | 20 | 20 | — |
|  | Isooctyl acrylate | — | — | — |
|  | Acryloyl morpholine | — | — | — |
|  | Stearyl acrylate | — | — | — |
|  | Ethyl acrylate | — | — | — |
| Multifunctional monomers | 1,6-Hexanediol diacrylate | — | — | — |
|  | 1,3-Butylene glycol diacrylate | — | — | — |
| Oligomers | Urethane methacrylate (weight average molecular weight: 6,500) | — | — | — |
|  | Ethoxylated bisphenol A diacrylate (weight average molecular weight: 1,216) | — | — | 5 |
|  | Urethane acrylate (weight average molecular weight: 2,700) | — | — | — |
|  | Ester-based urethane acrylate (weight average molecular weight: 4,500) | — | — | — |
|  | Polyethylene glycol #400 dimethacrylate (weight average molecular weight: 536) | — | — | — |
|  | Composite urethane acrylate (weight average molecular weight: 8,500) | — | — | — |
|  | Polyester-based urethane acrylate oligomer (weight average molecular weight: 5,000) | — | — | — |
| Resins | Resin 1 (weight average molecular weight: 6,500) | — | — | — |
|  | Resin 2 (weight average molecular weight: 10,900) | — | — | — |
|  | Resin 3 (weight average molecular weight: 16,000) | 5 | — | — |
|  | Resin 4 (weight average molecular weight: 25,000) | — | 5 | — |
|  | Resin 5 (weight average molecular weight: 5,000) | — | — | — |
|  | Resin 6 (weight average molecular weight: 35,000) | — | — | — |
|  | Resin 7 (weight average molecular weight: 40,000) | — | — | — |
|  | Resin 8 (weight average molecular weight: 40,000) | — | — | — |
|  | Resin 9 (weight average molecular weight: 27,600) | — | — | — |
| Silica particles | Silica particles 1 (average primary particle diameter: 70 nm) | — | — | — |
|  | Silica particles 2 (average primary particle diameter: 50 nm) | — | — | — |
|  | Silica particles 3 (average primary particle diameter: 30 nm) | — | — | — |
|  | Silica particles 4 (average primary particle diameter: 10 nm) | — | — | — |
|  | Silica particles 5 (average primary particle diameter: 100 nm) | — | — | — |
| Polymerization initiators | Hydroxy-cyclohexyl-phenyl-ketone | 2.5 | 7.5 | 7.5 |
|  | 2-Hydroxy-1-{4-[4-(2-hydroxy-2-methyl-propionyl)-benzyl]phenyl}-2-methyl-propan-1-one | 5 | — | — |
|  | 2,4,6-Trimethylbenzoyl-diphenyl-phosphine oxide | — | — | — |
|  | 2,4-Diethylthioxanthone | — | — | — |
| Colorant | Cyan pigment dispersion | 5 | 5 | 5 |
|  | Critical load ($W_1$) (g) | 18.9 | 24.9 | 5.4 |

TABLE 3-1

|  |  | Examples | | |
|---|---|---|---|---|
|  |  | 13 | 14 | 15 |
| Monofunctional monomers | Tetrahydrofurfuryl acrylate | — | — | — |
|  | Isobornyl acrylate | 25 | 25 | 25 |
|  | Phenoxyethyl acrylate | 25 | 25 | 25 |
|  | N-vinylcaprolactam | 50 | 50 | 50 |

TABLE 3-1-continued

|  |  | Examples | | |
|---|---|---|---|---|
|  |  | 13 | 14 | 15 |
|  | 1-Adamantyl acrylate | — | — | — |
|  | Isooctyl acrylate | — | — | — |
|  | Acryloyl morpholine | — | — | — |
|  | Stearyl acrylate | — | — | — |
|  | Ethyl acrylate | — | — | — |
| Multifunctional monomers | 1,6-Hexanediol diacrylate | — | — | — |
|  | 1,3-Butylene glycol diacrylate | — | — | — |
| Oligomers | Urethane methacrylate (weight average molecular weight: 6,500) | — | — | — |
|  | Ethoxylated bisphenol A diacrylate (weight average molecular weight: 1,216) | — | — | — |
|  | Urethane acrylate (weight average molecular weight: 2,700) | 5 | — | — |
|  | Ester-based urethane acrylate (weight average molecular weight: 4,500) | — | 5 | 5 |
|  | Polyethylene glycol #400 dimethacrylate (weight average molecular weight: 536) | — | — | — |
|  | Composite urethane acrylate (weight average molecular weight: 8,500) | — | — | — |
|  | Polyester-based urethane acrylate oligomer (weight average molecular weight: 5,000) | — | — | — |
| Resins | Resin 1 (weight average molecular weight: 6,500) | — | — | — |
|  | Resin 2 (weight average molecular weight: 10,900) | — | — | — |
|  | Resin 3 (weight average molecular weight: 16,000) | — | — | — |
|  | Resin 4 (weight average molecular weight: 25,000) | — | — | — |
|  | Resin 5 (weight average molecular weight: 5,000) | — | — | — |
|  | Resin 6 (weight average molecular weight: 35,000) | — | — | — |
|  | Resin 7 (weight average molecular weight: 40,000) | — | — | — |
|  | Resin 8 (weight average molecular weight: 40,000) | — | — | — |
|  | Resin 9 (weight average molecular weight: 27,600) | — | — | — |
| Silica particles | Silica particles 1 (average primary particle diameter: 70 nm) | — | — | — |
|  | Silica particles 2 (average primary particle diameter: 50 nm) | — | — | — |
|  | Silica particles 3 (average primary particle diameter: 30 nm) | — | — | — |
|  | Silica particles 4 (average primary particle diameter: 10 nm) | — | — | — |
|  | Silica particles 5 (average primary particle diameter: 100 nm) | — | — | — |
| Polymerization initiators | Hydroxy-cyclohexyl-phenyl-ketone | 7.5 | 2.5 | 7.5 |
|  | 2-Hydroxy-1-{4-[4-(2-hydroxy-2-methyl-propionyl)-benzyl]phenyl}-2-methyl-propan-1-one | — | 5 | — |
|  | 2,4,6-Trimethylbenzoyl-diphenyl-phosphine oxide | — | — | — |
|  | 2,4-Diethylthioxanthone | — | — | — |
| Colorant | Cyan pigment dispersion | 5 | 5 | 5 |
|  | Critical load ($W_1$) (g) | 11.1 | 13.6 | 16.1 |

TABLE 3-2

|  |  | Examples | | |
|---|---|---|---|---|
|  |  | 16 | 17 | 18 |
| Monofunctional monomers | Tetrahydrofurfuryl acrylate | — | — | 40 |
|  | Isobornyl acrylate | 25 | 25 | 40 |
|  | Phenoxyethyl acrylate | 25 | 25 | — |
|  | N-vinylcaprolactam | 50 | 50 | 10 |
|  | 1-Adamantyl acrylate | — | — | — |
|  | Isooctyl acrylate | — | — | — |
|  | Acryloyl morpholine | — | — | 10 |
|  | Stearyl acrylate | — | — | — |
|  | Ethyl acrylate | — | — | — |
| Multifunctional monomers | 1,6-Hexanediol diacrylate | — | — | — |
|  | 1,3-Butylene glycol diacrylate | — | — | — |
| Oligomers | Urethane methacrylate (weight average molecular weight: 6,500) | 5 | — | — |
|  | Ethoxylated bisphenol A diacrylate (weight average molecular weight: 1,216) | — | — | 5 |
|  | Urethane acrylate (weight average molecular weight: 2,700) | — | — | — |
|  | Ester-based urethane acrylate (weight average molecular weight: 4,500) | — | — | — |
|  | Polyethylene glycol #400 dimethacrylate (weight average molecular weight: 536) | — | — | — |
|  | Composite urethane acrylate (weight average molecular weight: 8,500) | — | — | — |

TABLE 3-2-continued

|  |  | Examples | | |
|---|---|---|---|---|
|  |  | 16 | 17 | 18 |
| Resins | Polyester-based urethane acrylate oligomer (weight average molecular weight: 5,000) | — | — | — |
|  | Resin 1 (weight average molecular weight: 6,500) | — | 5 | — |
|  | Resin 2 (weight average molecular weight: 10,900) | — | — | — |
|  | Resin 3 (weight average molecular weight: 16,000) | — | — | — |
|  | Resin 4 (weight average molecular weight: 25,000) | — | — | — |
|  | Resin 5 (weight average molecular weight: 5,000) | — | — | — |
|  | Resin 6 (weight average molecular weight: 35,000) | — | — | — |
|  | Resin 7 (weight average molecular weight: 40,000) | — | — | — |
|  | Resin 8 (weight average molecular weight: 40,000) | — | — | — |
|  | Resin 9 (weight average molecular weight: 27,600) | — | — | — |
| Silica particles | Silica particles 1 (average primary particle diameter: 70 nm) | — | — | — |
|  | Silica particles 2 (average primary particle diameter: 50 nm) | — | — | — |
|  | Silica particles 3 (average primary particle diameter: 30 nm) | — | — | — |
|  | Silica particles 4 (average primary particle diameter: 10 nm) | — | — | — |
|  | Silica particles 5 (average primary particle diameter: 100 nm) | — | — | — |
| Polymerization initiators | Hydroxy-cyclohexyl-phenyl-ketone | 7.5 | 7.5 | 7.5 |
|  | 2-Hydroxy-1-{4-[4-(2-hydroxy-2-methyl-propionyl)-benzyl]phenyl}-2-methyl-propan-1-one | — | — | — |
|  | 2,4,6-Trimethylbenzoyl-diphenyl-phosphine oxide | — | — | — |
|  | 2,4-Diethylthioxanthone | — | — | — |
| Colorant | Cyan pigment dispersion | 5 | 5 | 5 |
|  | Critical load ($W_1$) (g) | 23.9 | 5.6 | 5.0 |

TABLE 4-1

|  |  | Examples | | |
|---|---|---|---|---|
|  |  | 19 | 20 | 21 |
| Monofunctional monomers | Tetrahydrofurfuryl acrylate | 40 | 40 | 40 |
|  | Isobornyl acrylate | 40 | 40 | 40 |
|  | Phenoxyethyl acrylate | — | — | — |
|  | N-vinylcaprolactam | 10 | 10 | 10 |
|  | 1-Adamantyl acrylate | — | — | — |
|  | Isooctyl acrylate | — | — | — |
|  | Acryloyl morpholine | 10 | 10 | 10 |
|  | Stearyl acrylate | — | — | — |
|  | Ethyl acrylate | — | — | — |
| Multifunctional monomers | 1,6-Hexanediol diacrylate | — | — | — |
|  | 1,3-Butylene glycol diacrylate | — | — | — |
| Oligomers | Urethane methacrylate (weight average molecular weight: 6,500) | — | — | — |
|  | Ethoxylated bisphenol A diacrylate (weight average molecular weight: 1,216) | — | — | — |
|  | Urethane acrylate (weight average molecular weight: 2,700) | 5 | — | — |
|  | Ester-based urethane acrylate (weight average molecular weight: 4,500) | — | 5 | 5 |
|  | Polyethylene glycol #400 dimethacrylate (weight average molecular weight: 536) | — | — | — |
|  | Composite urethane acrylate (weight average molecular weight: 8,500) | — | — | — |
|  | Polyester-based urethane acrylate oligomer (weight average molecular weight: 5,000) | — | — | — |
| Resins | Resin 1 (weight average molecular weight: 6,500) | — | — | — |
|  | Resin 2 (weight average molecular weight: 10,900) | — | — | — |
|  | Resin 3 (weight average molecular weight: 16,000) | — | — | — |
|  | Resin 4 (weight average molecular weight: 25,000) | — | — | — |
|  | Resin 5 (weight average molecular weight: 5,000) | — | — | — |
|  | Resin 6 (weight average molecular weight: 35,000) | — | — | — |
|  | Resin 7 (weight average molecular weight: 40,000) | — | — | — |
|  | Resin 8 (weight average molecular weight: 40,000) | — | — | — |
|  | Resin 9 (weight average molecular weight: 27,600) | — | — | — |
| Silica particles | Silica particles 1 (average primary particle diameter: 70 nm) | — | — | — |
|  | Silica particles 2 (average primary particle diameter: 50 nm) | — | — | — |
|  | Silica particles 3 (average primary particle diameter: 30 nm) | — | — | — |
|  | Silica particles 4 (average primary particle diameter: 10 nm) | — | — | — |
|  | Silica particles 5 (average primary particle diameter: 100 nm) | — | — | — |

TABLE 4-1-continued

|  |  | Examples | | |
|---|---|---|---|---|
|  |  | 19 | 20 | 21 |
| Polymerization initiators | Hydroxy-cyclohexyl-phenyl-ketone | 7.5 | 2.5 | 7.5 |
|  | 2-Hydroxy-1-{4-[4-(2-hydroxy-2-methyl-propionyl)-benzyl]phenyl}-2-methyl-propan-1-one | — | 5 | — |
|  | 2,4,6-Trimethylbenzoyl-diphenyl-phosphine oxide | — | — | — |
|  | 2,4-Diethylthioxanthone | — | — | — |
| Colorant | Cyan pigment dispersion | 5 | 5 | 5 |
|  | Critical load ($W_1$) (g) | 10.1 | 13.6 | 15.2 |

TABLE 4-2

|  |  | Examples | | |
|---|---|---|---|---|
|  |  | 22 | 23 | 24 |
| Monofunctional monomers | Tetrahydrofurfuryl acrylate | 40 | — | — |
|  | Isobornyl acrylate | 40 | — | — |
|  | Phenoxyethyl acrylate | — | 25 | 25 |
|  | N-vinylcaprolactam | 10 | — | — |
|  | 1-Adamantyl acrylate | — | — | — |
|  | Isooctyl acrylate | — | 20 | 20 |
|  | Acryloyl morpholine | 10 | — | — |
|  | Stearyl acrylate | — | 50 | 50 |
|  | Ethyl acrylate | — | — | — |
| Multifunctional monomers | 1,6-Hexanediol diacrylate | — | 5 | 5 |
|  | 1,3-Butylene glycol diacrylate | — | — | — |
| Oligomers | Urethane methacrylate (weight average molecular weight: 6,500) | 5 | — | — |
|  | Ethoxylated bisphenol A diacrylate (weight average molecular weight: 1,216) | — | — | — |
|  | Urethane acrylate (weight average molecular weight: 2,700) | — | — | — |
|  | Ester-based urethane acrylate (weight average molecular weight: 4,500) | — | — | — |
|  | Polyethylene glycol #400 dimethacrylate (weight average molecular weight: 536) | — | — | — |
|  | Composite urethane acrylate (weight average molecular weight: 8,500) | — | — | — |
|  | Polyester-based urethane acrylate oligomer (weight average molecular weight: 5,000) | — | — | — |
| Resins | Resin 1 (weight average molecular weight: 6,500) | — | — | — |
|  | Resin 2 (weight average molecular weight: 10,900) | — | — | — |
|  | Resin 3 (weight average molecular weight: 16,000) | — | — | — |
|  | Resin 4 (weight average molecular weight: 25,000) | — | — | — |
|  | Resin 5 (weight average molecular weight: 5,000) | — | — | — |
|  | Resin 6 (weight average molecular weight: 35,000) | — | — | — |
|  | Resin 7 (weight average molecular weight: 40,000) | — | — | — |
|  | Resin 8 (weight average molecular weight: 40,000) | — | — | — |
|  | Resin 9 (weight average molecular weight: 27,600) | — | — | — |
| Silica particles | Silica particles 1 (average primary particle diameter: 70 nm) | — | 1.5 | — |
|  | Silica particles 2 (average primary particle diameter: 50 nm) | — | — | 1.5 |
|  | Silica particles 3 (average primary particle diameter: 30 nm) | — | — | — |
|  | Silica particles 4 (average primary particle diameter: 10 nm) | — | — | — |
|  | Silica particles 5 (average primary particle diameter: 100 nm) | — | — | — |
| Polymerization initiators | Hydroxy-cyclohexyl-phenyl-ketone | 7.5 | 7.5 | 7.5 |
|  | 2-Hydroxy-1-{4-[4-(2-hydroxy-2-methyl-propionyl)-benzyl]phenyl}-2-methyl-propan-1-one | — | — | — |
|  | 2,4,6-Trimethylbenzoyl-diphenyl-phosphine oxide | — | — | — |
|  | 2,4-Diethylthioxanthone | — | — | — |
| Colorant | Cyan pigment dispersion | 5 | 5 | 5 |
| Critical load ($W_1$) (g) |  | 21.0 | 9.7 | 14.5 |

TABLE 5-1

|  |  | Examples | | |
|---|---|---|---|---|
|  |  | 25 | 26 | 27 |
| Monofunctional monomers | Tetrahydrofurfuryl acrylate | — | — | — |
|  | Isobornyl acrylate | — | — | — |
|  | Phenoxyethyl acrylate | 25 | 25 | 25 |
|  | N-vinylcaprolactam | — | — | — |

TABLE 5-1-continued

|  |  | Examples | | |
|---|---|---|---|---|
|  |  | 25 | 26 | 27 |
| | 1-Adamantyl acrylate | — | — | — |
| | Isooctyl acrylate | 20 | 20 | 20 |
| | Acryloyl morpholine | — | — | — |
| | Stearyl acrylate | 50 | 50 | 50 |
| | Ethyl acrylate | — | — | — |
| Multifunctional monomers | 1,6-Hexanediol diacrylate | 5 | 5 | 5 |
| | 1,3-Butylene glycol diacrylate | — | — | — |
| Oligomers | Urethane methacrylate (weight average molecular weight: 6,500) | — | — | — |
| | Ethoxylated bisphenol A diacrylate (weight average molecular weight: 1,216) | — | — | — |
| | Urethane acrylate (weight average molecular weight: 2,700) | — | — | — |
| | Ester-based urethane acrylate (weight average molecular weight: 4,500) | — | — | — |
| | Polyethylene glycol #400 dimethacrylate (weight average molecular weight: 536) | — | — | — |
| | Composite urethane acrylate (weight average molecular weight: 8,500) | — | — | — |
| | Polyester-based urethane acrylate oligomer (weight average molecular weight: 5,000) | — | — | — |
| Resins | Resin 1 (weight average molecular weight: 6,500) | — | — | — |
| | Resin 2 (weight average molecular weight: 10,900) | — | — | — |
| | Resin 3 (weight average molecular weight: 16,000) | — | — | — |
| | Resin 4 (weight average molecular weight: 25,000) | — | — | — |
| | Resin 5 (weight average molecular weight: 5,000) | — | — | — |
| | Resin 6 (weight average molecular weight: 35,000) | — | — | — |
| | Resin 7 (weight average molecular weight: 40,000) | — | — | — |
| | Resin 8 (weight average molecular weight: 40,000) | — | — | — |
| | Resin 9 (weight average molecular weight: 27,600) | — | — | — |
| Silica particles | Silica particles 1 (average primary particle diameter: 70 nm) | — | — | — |
| | Silica particles 2 (average primary particle diameter: 50 nm) | 1.5 | — | 1.0 |
| | Silica particles 3 (average primary particle diameter: 30 nm) | — | 1.5 | — |
| | Silica particles 4 (average primary particle diameter: 10 nm) | — | — | — |
| | Silica particles 5 (average primary particle diameter: 100 nm) | — | — | — |
| Polymerization initiators | Hydroxy-cyclohexyl-phenyl-ketone | 2.5 | 7.5 | 7.5 |
| | 2-Hydroxy-1-{4-[4-(2-hydroxy-2-methyl-propionyl)-benzyl]phenyl}-2-methyl-propan-1-one | 5 | — | — |
| | 2,4,6-Trimethylbenzoyl-diphenyl-phosphine oxide | — | — | — |
| | 2,4-Diethylthioxanthone | — | — | — |
| Colorant | Cyan pigment dispersion | 5 | 5 | 5 |
| Critical load ($W_1$) (g) | | 19.1 | 24.4 | 12.2 |

TABLE 5-2

|  |  | Examples | | |
|---|---|---|---|---|
|  |  | 28 | 29 | 30 |
| Monofunctional monomers | Tetrahydrofurfuryl acrylate | — | — | — |
| | Isobornyl acrylate | — | 50 | 50 |
| | Phenoxyethyl acrylate | 25 | — | — |
| | N-vinylcaprolactam | — | — | — |
| | 1-Adamantyl acrylate | — | 30 | 30 |
| | Isooctyl acrylate | 20 | — | — |
| | Acryloyl morpholine | — | 10 | 10 |
| | Stearyl acrylate | 50 | — | — |
| | Ethyl acrylate | — | 10 | 10 |
| Multifunctional monomers | 1,6-Hexanediol diacrylate | 5 | — | — |
| | 1,3-Butylene glycol diacrylate | — | — | — |
| Oligomers | Urethane methacrylate (weight average molecular weight: 6,500) | — | — | — |
| | Ethoxylated bisphenol A diacrylate (weight average molecular weight: 1,216) | — | — | — |
| | Urethane acrylate (weight average molecular weight: 2,700) | — | — | — |
| | Ester-based urethane acrylate (weight average molecular weight: 4,500) | — | — | — |
| | Polyethylene glycol #400 dimethacrylate (weight average molecular weight: 536) | — | — | — |
| | Composite urethane acrylate (weight average molecular weight: 8,500) | — | — | — |

TABLE 5-2-continued

|  |  | Examples | | |
|---|---|---|---|---|
|  |  | 28 | 29 | 30 |
| Resins | Polyester-based urethane acrylate oligomer (weight average molecular weight: 5,000) | — | — | — |
|  | Resin 1 (weight average molecular weight: 6,500) | — | — | — |
|  | Resin 2 (weight average molecular weight: 10,900) | — | — | — |
|  | Resin 3 (weight average molecular weight: 16,000) | — | — | — |
|  | Resin 4 (weight average molecular weight: 25,000) | — | — | — |
|  | Resin 5 (weight average molecular weight: 5,000) | — | — | — |
|  | Resin 6 (weight average molecular weight: 35,000) | — | — | — |
|  | Resin 7 (weight average molecular weight: 40,000) | — | — | — |
|  | Resin 8 (weight average molecular weight: 40,000) | — | — | — |
|  | Resin 9 (weight average molecular weight: 27,600) | — | — | — |
| Silica particles | Silica particles 1 (average primary particle diameter: 70 nm) | — | 1.5 | — |
|  | Silica particles 2 (average primary particle diameter: 50 nm) | 2.0 | — | 1.5 |
|  | Silica particles 3 (average primary particle diameter: 30 nm) | — | — | — |
|  | Silica particles 4 (average primary particle diameter: 10 nm) | — | — | — |
|  | Silica particles 5 (average primary particle diameter: 100 nm) | — | — | — |
| Polymerization initiators | Hydroxy-cyclohexyl-phenyl-ketone | 7.5 | 7.5 | 7.5 |
|  | 2-Hydroxy-1-{4-[4-(2-hydroxy-2-methyl-propionyl)-benzyl]phenyl}-2-methyl-propan-1-one | — | — | — |
|  | 2,4,6-Trimethylbenzoyl-diphenyl-phosphine oxide | — | — | — |
|  | 2,4-Diethylthioxanthone | — | — | — |
| Colorant | Cyan pigment dispersion | 5 | 5 | 5 |
| Critical load ($W_1$) (g) |  | 19.4 | 5.6 | 11.7 |

TABLE 6-1

|  |  | Examples | |
|---|---|---|---|
|  |  | 31 | 32 |
| Monofunctional monomers | Tetrahydrofurfuryl acrylate | — | — |
|  | Isobornyl acrylate | 50 | 50 |
|  | Phenoxyethyl acrylate | — | — |
|  | N-vinylcaprolactam | — | — |
|  | 1-Adamantyl acrylate | 30 | 30 |
|  | Isooctyl acrylate | — | — |
|  | Acryloyl morpholine | 10 | 10 |
|  | Stearyl acrylate | — | — |
|  | Ethyl acrylate | 10 | 10 |
| Multifunctional monomers | 1,6-Hexanediol diacrylate | — | — |
|  | 1,3-Butylene glycol diacrylate | — | — |
| Oligomers | Urethane methacrylate (weight average molecular weight: 6,500) | — | — |
|  | Ethoxylated bisphenol A diacrylate (weight average molecular weight: 1,216) | — | — |
|  | Urethane acrylate (weight average molecular weight: 2,700) | — | — |
|  | Ester-based urethane acrylate (weight average molecular weight: 4,500) | — | — |
|  | Polyethylene glycol #400 dimethacrylate (weight average molecular weight: 536) | — | — |
|  | Composite urethane acrylate (weight average molecular weight: 8,500) | — | — |
|  | Polyester-based urethane acrylate oligomer (weight average molecular weight: 5,000) | — | — |
| Resins | Resin 1 (weight average molecular weight: 6,500) | — | — |
|  | Resin 2 (weight average molecular weight: 10,900) | — | — |
|  | Resin 3 (weight average molecular weight: 16,000) | — | — |
|  | Resin 4 (weight average molecular weight: 25,000) | — | — |
|  | Resin 5 (weight average molecular weight: 5,000) | — | — |
|  | Resin 6 (weight average molecular weight: 35,000) | — | — |
|  | Resin 7 (weight average molecular weight: 40,000) | — | — |
|  | Resin 8 (weight average molecular weight: 40,000) | — | — |
|  | Resin 9 (weight average molecular weight: 27,600) | — | — |
| Silica particles | Silica particles 1 (average primary particle diameter: 70 nm) | — | — |
|  | Silica particles 2 (average primary particle diameter: 50 nm) | 1.5 | — |
|  | Silica particles 3 (average primary particle diameter: 30 nm) | — | 1.5 |
|  | Silica particles 4 (average primary particle diameter: 10 nm) | — | — |
|  | Silica particles 5 (average primary particle diameter: 100 nm) | — | — |

TABLE 6-1-continued

|  |  | Examples | |
|---|---|---|---|
|  |  | 31 | 32 |
| Polymerization initiators | Hydroxy-cyclohexyl-phenyl-ketone | 2.5 | 7.5 |
|  | 2-Hydroxy-1-{4-[4-(2-hydroxy-2-methyl-propionyl)-benzyl]phenyl}-2-methyl-propan-1-one | 5 | — |
|  | 2,4,6-Trimethylbenzoyl-diphenyl-phosphine oxide | — | — |
|  | 2,4-Diethylthioxanthone | — | — |
| Colorant | Cyan pigment dispersion | 5 | 5 |
| Critical load (W₁) (g) |  | 15.3 | 22.3 |

TABLE 6-2

|  |  | Examples | |
|---|---|---|---|
|  |  | 33 | 34 |
| Monofunctional monomers | Tetrahydrofurfuryl acrylate | — | — |
|  | Isobornyl acrylate | 50 | 50 |
|  | Phenoxyethyl acrylate | — | — |
|  | N-vinylcaprolactam | — | — |
|  | 1-Adamantyl acrylate | 30 | 30 |
|  | Isooctyl acrylate | — | — |
|  | Acryloyl morpholine | 10 | 10 |
|  | Stearyl acrylate | — | — |
|  | Ethyl acrylate | 10 | 10 |
| Multifunctional monomers | 1,6-Hexanediol diacrylate | — | — |
|  | 1,3-Butylene glycol diacrylate | — | — |
| Oligomers | Urethane methacrylate (weight average molecular weight: 6,500) | — | — |
|  | Ethoxylated bisphenol A diacrylate (weight average molecular weight: 1,216) | — | — |
|  | Urethane acrylate (weight average molecular weight: 2,700) | — | — |
|  | Ester-based urethane acrylate (weight average molecular weight: 4,500) | — | — |
|  | Polyethylene glycol #400 dimethacrylate (weight average molecular weight: 536) | — | — |
|  | Composite urethane acrylate (weight average molecular weight: 8,500) | — | — |
|  | Polyester-based urethane acrylate oligomer (weight average molecular weight: 5,000) | — | — |
| Resins | Resin 1 (weight average molecular weight: 6,500) | — | — |
|  | Resin 2 (weight average molecular weight: 10,900) | — | — |
|  | Resin 3 (weight average molecular weight: 16,000) | — | — |
|  | Resin 4 (weight average molecular weight: 25,000) | — | — |
|  | Resin 5 (weight average molecular weight: 5,000) | — | — |
|  | Resin 6 (weight average molecular weight: 35,000) | — | — |
|  | Resin 7 (weight average molecular weight: 40,000) | — | — |
|  | Resin 8 (weight average molecular weight: 40,000) | — | — |
|  | Resin 9 (weight average molecular weight: 27,600) | — | — |
| Silica particles | Silica particles 1 (average primary particle diameter: 70 nm) | — | — |
|  | Silica particles 2 (average primary particle diameter: 50 nm) | 1.0 | 2.0 |
|  | Silica particles 3 (average primary particle diameter: 30 nm) | — | — |
|  | Silica particles 4 (average primary particle diameter: 10 nm) | — | — |
|  | Silica particles 5 (average primary particle diameter: 100 nm) | — | — |
| Polymerization initiators | Hydroxy-cyclohexyl-phenyl-ketone | 7.5 | 7.5 |
|  | 2-Hydroxy-1-{4-[4-(2-hydroxy-2-methyl-propionyl)-benzyl]phenyl}-2-methyl-propan-1-one | — | — |
|  | 2,4,6-Trimethylbenzoyl-diphenyl-phosphine oxide | — | — |
|  | 2,4-Diethylthioxanthone | — | — |
| Colorant | Cyan pigment dispersion | 5 | 5 |
| Critical load (W₁) (g) |  | 12.6 | 21.3 |

TABLE 7-1

|  |  | Comparative Examples | | |
|---|---|---|---|---|
|  |  | 1 | 2 | 3 |
| Monofunctional monomers | Tetrahydrofurfuryl acrylate | — | 25 | 25 |
|  | Isobornyl acrylate | — | 25 | 25 |
|  | Phenoxyethyl acrylate | — | 25 | 25 |
|  | N-vinylcaprolactam | — | 25 | 25 |

TABLE 7-1-continued

|  |  | Comparative Examples | | |
|---|---|---|---|---|
|  |  | 1 | 2 | 3 |
|  | 1-Adamantyl acrylate | — | — | — |
|  | Isooctyl acrylate | — | — | — |
|  | Acryloyl morpholine | — | — | — |
|  | Stearyl acrylate | — | — | — |
|  | Ethyl acrylate | — | — | — |
| Multifunctional monomers | 1,6-Hexanediol diacrylate | 100 | — | — |
|  | 1,3-Butylene glycol diacrylate | — | — | — |
| Oligomers | Urethane methacrylate (weight average molecular weight: 6,500) | — | — | — |
|  | Ethoxylated bisphenol A diacrylate (weight average molecular weight: 1,216) | — | — | — |
|  | Urethane acrylate (weight average molecular weight: 2,700) | — | — | — |
|  | Ester-based urethane acrylate (weight average molecular weight: 4,500) | — | — | — |
|  | Polyethylene glycol #400 dimethacrylate (weight average molecular weight: 536) | — | — | — |
|  | Composite urethane acrylate (weight average molecular weight: 8,500) | — | — | — |
|  | Polyester-based urethane acrylate oligomer (weight average molecular weight: 5,000) | — | — | — |
| Resins | Resin 1 (weight average molecular weight: 6,500) | 5 | — | — |
|  | Resin 2 (weight average molecular weight: 10,900) | — | — | — |
|  | Resin 3 (weight average molecular weight: 16,000) | — | — | — |
|  | Resin 4 (weight average molecular weight: 25,000) | — | — | — |
|  | Resin 5 (weight average molecular weight: 5,000) | — | 5 | — |
|  | Resin 6 (weight average molecular weight: 35,000) | — | — | 5 |
|  | Resin 7 (weight average molecular weight: 40,000) | — | — | — |
|  | Resin 8 (weight average molecular weight: 40,000) | — | — | — |
|  | Resin 9 (weight average molecular weight: 27,600) | — | — | — |
| Silica particles | Silica particles 1 (average primary particle diameter: 70 nm) | — | — | — |
|  | Silica particles 2 (average primary particle diameter: 50 nm) | — | — | — |
|  | Silica particles 3 (average primary particle diameter: 30 nm) | — | — | — |
|  | Silica particles 4 (average primary particle diameter: 10 nm) | — | — | — |
|  | Silica particles 5 (average primary particle diameter: 100 nm) | — | — | — |
| Polymerization initiators | Hydroxy-cyclohexyl-phenyl-ketone | 7.5 | 7.5 | 7.5 |
|  | 2-Hydroxy-1-{4-[4-(2-hydroxy-2-methyl-propionyl)-benzyl]phenyl}-2-methyl-propan-1-one | — | — | — |
|  | 2,4,6-Trimethylbenzoyl-diphenyl-phosphine oxide | — | — | — |
|  | 2,4-Diethylthioxanthone | — | — | — |
| Colorant | Cyan pigment dispersion | 5 | 5 | 5 |
| Critical load ($W_1$) (g) |  | 50.0 or more | 3.6 | 25.3 |

TABLE 7-2

|  |  | Comparative Examples | | |
|---|---|---|---|---|
|  |  | 4 | 5 | 6 |
| Monofunctional monomers | Tetrahydrofurfuryl acrylate | 25 | 25 | — |
|  | Isobornyl acrylate | 25 | 25 | 40 |
|  | Phenoxyethyl acrylate | 25 | 25 | — |
|  | N-vinylcaprolactam | 25 | 25 | 40 |
|  | 1-Adamantyl acrylate | — | — | 20 |
|  | Isooctyl acrylate | — | — | — |
|  | Acryloyl morpholine | — | — | — |
|  | Stearyl acrylate | — | — | — |
|  | Ethyl acrylate | — | — | — |
| Multifunctional monomers | 1,6-Hexanediol diacrylate | — | — | — |
|  | 1,3-Butylene glycol diacrylate | — | — | — |
| Oligomers | Urethane methacrylate (weight average molecular weight: 6,500) | — | — | — |
|  | Ethoxylated bisphenol A diacrylate (weight average molecular weight: 1,216) | — | — | — |
|  | Urethane acrylate (weight average molecular weight: 2,700) | — | — | — |
|  | Ester-based urethane acrylate (weight average molecular weight: 4,500) | — | — | — |
|  | Polyethylene glycol #400 dimethacrylate (weight average molecular weight: 536) | — | 5 | — |

TABLE 7-2-continued

|  |  | Comparative Examples | | |
|---|---|---|---|---|
|  |  | 4 | 5 | 6 |
|  | Composite urethane acrylate (weight average molecular weight: 8,500) | — | — | — |
|  | Polyester-based urethane acrylate oligomer (weight average molecular weight: 5,000) | — | — | — |
| Resins | Resin 1 (weight average molecular weight: 6,500) | — | — | — |
|  | Resin 2 (weight average molecular weight: 10,900) | — | — | — |
|  | Resin 3 (weight average molecular weight: 16,000) | — | — | — |
|  | Resin 4 (weight average molecular weight: 25,000) | — | — | — |
|  | Resin 5 (weight average molecular weight: 5,000) | — | — | 5 |
|  | Resin 6 (weight average molecular weight: 35,000) | — | — | — |
|  | Resin 7 (weight average molecular weight: 40,000) | — | — | — |
|  | Resin 8 (weight average molecular weight: 40,000) | — | — | — |
|  | Resin 9 (weight average molecular weight: 27,600) | — | — | — |
| Silica particles | Silica particles 1 (average primary particle diameter: 70 nm) | — | — | — |
|  | Silica particles 2 (average primary particle diameter: 50 nm) | — | — | — |
|  | Silica particles 3 (average primary particle diameter: 30 nm) | — | — | — |
|  | Silica particles 4 (average primary particle diameter: 10 nm) | — | — | — |
|  | Silica particles 5 (average primary particle diameter: 100 nm) | — | — | — |
| Polymerization initiators | Hydroxy-cyclohexyl-phenyl-ketone | 7.5 | 7.5 | 7.5 |
|  | 2-Hydroxy-1-{4-[4-(2-hydroxy-2-methyl-propionyl)-benzyl]phenyl}-2-methyl-propan-1-one | — | — | — |
|  | 2,4,6-Trimethylbenzoyl-diphenyl-phosphine oxide | — | — | — |
|  | 2,4-Diethylthioxanthone | — | — | — |
| Colorant | Cyan pigment dispersion | 5 | 5 | 5 |
| Critical load ($W_1$) (g) |  | 0.5 | 3.3 | 3.2 |

TABLE 8-1

|  |  | Comparative Examples | | |
|---|---|---|---|---|
|  |  | 7 | 8 | 9 |
| Monofunctional monomers | Tetrahydrofurfuryl acrylate | — | — | — |
|  | Isobornyl acrylate | 40 | 25 | 25 |
|  | Phenoxyethyl acrylate | — | 25 | 25 |
|  | N-vinylcaprolactam | 40 | 50 | 50 |
|  | 1-Adamantyl acrylate | 20 | — | — |
|  | Isooctyl acrylate | — | — | — |
|  | Acryloyl morpholine | — | — | — |
|  | Stearyl acrylate | — | — | — |
|  | Ethyl acrylate | — | — | — |
| Multifunctional monomers | 1,6-Hexanediol diacrylate | — | — | — |
|  | 1,3-Butylene glycol diacrylate | — | — | — |
| Oligomers | Urethane methacrylate (weight average molecular weight: 6,500) | — | — | — |
|  | Ethoxylated bisphenol A diacrylate (weight average molecular weight: 1,216) | — | — | — |
|  | Urethane acrylate (weight average molecular weight: 2,700) | — | — | — |
|  | Ester-based urethane acrylate (weight average molecular weight: 4,500) | — | — | — |
|  | Polyethylene glycol #400 dimethacrylate (weight average molecular weight: 536) | — | 5 | — |
|  | Composite urethane acrylate (weight average molecular weight: 8,500) | — | — | 5 |
|  | Polyester-based urethane acrylate oligomer (weight average molecular weight: 5,000) | — | — | — |
| Resins | Resin 1 (weight average molecular weight: 6,500) | — | — | — |
|  | Resin 2 (weight average molecular weight: 10,900) | — | — | — |
|  | Resin 3 (weight average molecular weight: 16,000) | — | — | — |
|  | Resin 4 (weight average molecular weight: 25,000) | — | — | — |
|  | Resin 5 (weight average molecular weight: 5,000) | — | — | — |
|  | Resin 6 (weight average molecular weight: 35,000) | 5 | — | — |
|  | Resin 7 (weight average molecular weight: 40,000) | — | — | — |
|  | Resin 8 (weight average molecular weight: 40,000) | — | — | — |
|  | Resin 9 (weight average molecular weight: 27,600) | — | — | — |
| Silica particles | Silica particles 1 (average primary particle diameter: 70 nm) | — | — | — |
|  | Silica particles 2 (average primary particle diameter: 50 nm) | — | — | — |
|  | Silica particles 3 (average primary particle diameter: 30 nm) | — | — | — |
|  | Silica particles 4 (average primary particle diameter: 10 nm) | — | — | — |
|  | Silica particles 5 (average primary particle diameter: 100 nm) | — | — | — |

TABLE 8-1-continued

|  |  | Comparative Examples | | |
|---|---|---|---|---|
|  |  | 7 | 8 | 9 |
| Polymerization initiators | Hydroxy-cyclohexyl-phenyl-ketone | 7.5 | 7.5 | 7.5 |
|  | 2-Hydroxy-1-{4-[4-(2-hydroxy-2-methyl-propionyl)-benzyl]phenyl}-2-methyl-propan-1-one | — | — | — |
|  | 2,4,6-Trimethylbenzoyl-diphenyl-phosphine oxide | — | — | — |
|  | 2,4-Diethylthioxanthone | — | — | — |
| Colorant | Cyan pigment dispersion | 5 | 5 | 5 |
| Critical load ($W_1$) (g) |  | 30.3 | 4.8 | 28.0 |

TABLE 8-2

|  |  | Comparative Examples | | |
|---|---|---|---|---|
|  |  | 10 | 11 | 12 |
| Monofunctional monomers | Tetrahydrofurfuryl acrylate | — | — | 40 |
|  | Isobornyl acrylate | 25 | 25 | 40 |
|  | Phenoxyethyl acrylate | 25 | 25 | — |
|  | N-vinylcaprolactam | 50 | 50 | 10 |
|  | 1-Adamantyl acrylate | — | — | — |
|  | Isooctyl acrylate | — | — | — |
|  | Acryloyl morpholine | — | — | 10 |
|  | Stearyl acrylate | — | — | — |
|  | Ethyl acrylate | — | — | — |
| Multifunctional monomers | 1,6-Hexanediol diacrylate | — | — | — |
|  | 1,3-Butylene glycol diacrylate | — | — | — |
| Oligomers | Urethane methacrylate (weight average molecular weight: 6,500) | — | — | — |
|  | Ethoxylated bisphenol A diacrylate (weight average molecular weight: 1,216) | — | — | — |
|  | Urethane acrylate (weight average molecular weight: 2,700) | — | — | — |
|  | Ester-based urethane acrylate (weight average molecular weight: 4,500) | — | — | — |
|  | Polyethylene glycol #400 dimethacrylate (weight average molecular weight: 536) | — | — | 5 |
|  | Composite urethane acrylate (weight average molecular weight: 8,500) | — | — | — |
|  | Polyester-based urethane acrylate oligomer (weight average molecular weight: 5,000) | — | — | — |
| Resins | Resin 1 (weight average molecular weight: 6,500) | — | — | — |
|  | Resin 2 (weight average molecular weight: 10,900) | — | — | — |
|  | Resin 3 (weight average molecular weight: 16,000) | — | — | — |
|  | Resin 4 (weight average molecular weight: 25,000) | — | — | — |
|  | Resin 5 (weight average molecular weight: 5,000) | — | — | — |
|  | Resin 6 (weight average molecular weight: 35,000) | — | 5 | — |
|  | Resin 7 (weight average molecular weight: 40,000) | — | — | — |
|  | Resin 8 (weight average molecular weight: 40,000) | — | — | — |
|  | Resin 9 (weight average molecular weight: 27,600) | — | — | — |
| Silica particles | Silica particles 1 (average primary particle diameter: 70 nm) | — | — | — |
|  | Silica particles 2 (average primary particle diameter: 50 nm) | — | — | — |
|  | Silica particles 3 (average primary particle diameter: 30 nm) | — | — | — |
|  | Silica particles 4 (average primary particle diameter: 10 nm) | — | — | — |
|  | Silica particles 5 (average primary particle diameter: 100 nm) | — | — | — |
| Polymerization initiators | Hydroxy-cyclohexyl-phenyl-ketone | 7.5 | 7.5 | 7.5 |
|  | 2-Hydroxy-1-{4-[4-(2-hydroxy-2-methyl-propionyl)-benzyl]phenyl}-2-methyl-propan-1-one | — | — | — |
|  | 2,4,6-Trimethylbenzoyl-diphenyl-phosphine oxide | — | — | — |
|  | 2,4-Diethylthioxanthone | — | — | — |
| Colorant | Cyan pigment dispersion | 5 | 5 | 5 |
| Critical load ($W_1$) (g) |  | 0.6 | 27.4 | 3.7 |

TABLE 9-1

|  |  | Comparative Examples | | |
|---|---|---|---|---|
|  |  | 13 | 14 | 15 |
| Monofunctional monomers | Tetrahydrofurfuryl acrylate | 40 | — | — |
|  | Isobornyl acrylate | 40 | — | — |
|  | Phenoxyethyl acrylate | — | 25 | 25 |
|  | N-vinylcaprolactam | 10 | — | — |

TABLE 9-1-continued

|  |  | Comparative Examples | | |
|---|---|---|---|---|
|  |  | 13 | 14 | 15 |
|  | 1-Adamantyl acrylate | — | — | — |
|  | Isooctyl acrylate | — | 20 | 20 |
|  | Acryloyl morpholine | 10 | — | — |
|  | Stearyl acrylate | — | 50 | 50 |
|  | Ethyl acrylate | — | — | — |
| Multifunctional | 1,6-Hexanediol diacrylate | — | 5 | 5 |
| monomers | 1,3-Butylene glycol diacrylate | — | — | — |
| Oligomers | Urethane methacrylate (weight average molecular weight: 6,500) | — | — | — |
|  | Ethoxylated bisphenol A diacrylate (weight average molecular weight: 1,216) | — | — | — |
|  | Urethane acrylate (weight average molecular weight: 2,700) | — | — | — |
|  | Ester-based urethane acrylate (weight average molecular weight: 4,500) | — | — | — |
|  | Polyethylene glycol #400 dimethacrylate (weight average molecular weight: 536) | — | — | — |
|  | Composite urethane acrylate (weight average molecular weight: 8,500) | 5 | — | — |
|  | Polyester-based urethane acrylate oligomer (weight average molecular weight: 5,000) | — | — | — |
| Resins | Resin 1 (weight average molecular weight: 6,500) | — | — | — |
|  | Resin 2 (weight average molecular weight: 10,900) | — | — | — |
|  | Resin 3 (weight average molecular weight: 16,000) | — | — | — |
|  | Resin 4 (weight average molecular weight: 25,000) | — | — | — |
|  | Resin 5 (weight average molecular weight: 5,000) | — | — | — |
|  | Resin 6 (weight average molecular weight: 35,000) | — | — | — |
|  | Resin 7 (weight average molecular weight: 40,000) | — | — | — |
|  | Resin 8 (weight average molecular weight: 40,000) | — | — | — |
|  | Resin 9 (weight average molecular weight: 27,600) | — | — | — |
| Silica | Silica particles 1 (average primary particle diameter: 70 nm) | — | — | — |
| particles | Silica particles 2 (average primary particle diameter: 50 nm) | — | — | — |
|  | Silica particles 3 (average primary particle diameter: 30 nm) | — | — | — |
|  | Silica particles 4 (average primary particle diameter: 10 nm) | — | 1.5 | — |
|  | Silica particles 5 (average primary particle diameter: 100 nm) | — | — | 1.5 |
| Polymerization | Hydroxy-cyclohexyl-phenyl-ketone | 7.5 | 7.5 | 7.5 |
| initiators | 2-Hydroxy-1-{4-[4-(2-hydroxy-2-methyl-propionyl)-benzyl]phenyl}-2-methyl-propan-1-one | — | — | — |
|  | 2,4,6-Trimethylbenzoyl-diphenyl-phosphine oxide | — | — | — |
|  | 2,4-Diethylthioxanthone | — | — | — |
| Colorant | Cyan pigment dispersion | 5 | 5 | 5 |
| Critical load ($W_1$) (g) |  | 26.1 | 2.8 | 30.6 |

TABLE 9-2

|  |  | Comparative Examples | | |
|---|---|---|---|---|
|  |  | 16 | 17 | 18 |
| Monofunctional | Tetrahydrofurfuryl acrylate | — | — | — |
| monomers | Isobornyl acrylate | — | — | — |
|  | Phenoxyethyl acrylate | 25 | 25 | 25 |
|  | N-vinylcaprolactam | — | — | — |
|  | 1-Adamantyl acrylate | — | — | — |
|  | Isooctyl acrylate | 20 | 20 | 20 |
|  | Acryloyl morpholine | — | — | — |
|  | Stearyl acrylate | 50 | 50 | 50 |
|  | Ethyl acrylate | — | — | — |
| Multifunctional | 1,6-Hexanediol diacrylate | 5 | 5 | 5 |
| monomers | 1,3-Butylene glycol diacrylate | — | — | — |
| Oligomers | Urethane methacrylate (weight average molecular weight: 6,500) | — | — | — |
|  | Ethoxylated bisphenol A diacrylate (weight average molecular weight: 1,216) | — | — | — |
|  | Urethane acrylate (weight average molecular weight: 2,700) | — | — | — |
|  | Ester-based urethane acrylate (weight average molecular weight: 4,500) | — | — | — |
|  | Polyethylene glycol #400 dimethacrylate (weight average molecular weight: 536) | — | — | — |
|  | Composite urethane acrylate (weight average molecular weight: 8,500) | — | — | — |

TABLE 9-2-continued

|  |  | Comparative Examples | | |
|---|---|---|---|---|
|  |  | 16 | 17 | 18 |
| Resins | Polyester-based urethane acrylate oligomer (weight average molecular weight: 5,000) | — | — | — |
|  | Resin 1 (weight average molecular weight: 6,500) | — | — | — |
|  | Resin 2 (weight average molecular weight: 10,900) | — | — | — |
|  | Resin 3 (weight average molecular weight: 16,000) | — | — | — |
|  | Resin 4 (weight average molecular weight: 25,000) | — | — | — |
|  | Resin 5 (weight average molecular weight: 5,000) | — | — | — |
|  | Resin 6 (weight average molecular weight: 35,000) | — | — | — |
|  | Resin 7 (weight average molecular weight: 40,000) | — | — | — |
|  | Resin 8 (weight average molecular weight: 40,000) | — | — | — |
|  | Resin 9 (weight average molecular weight: 27,600) | — | — | — |
| Silica particles | Silica particles 1 (average primary particle diameter: 70 nm) | — | — | — |
|  | Silica particles 2 (average primary particle diameter: 50 nm) | 0.3 | 4.0 | — |
|  | Silica particles 3 (average primary particle diameter: 30 nm) | — | — | — |
|  | Silica particles 4 (average primary particle diameter: 10 nm) | — | — | — |
|  | Silica particles 5 (average primary particle diameter: 100 nm) | — | — | — |
| Polymerization initiators | Hydroxy-cyclohexyl-phenyl-ketone | 7.5 | 7.5 | 7.5 |
|  | 2-Hydroxy-1-{4-[4-(2-hydroxy-2-methyl-propionyl)-benzyl]phenyl}-2-methyl-propan-1-one | — | — | — |
|  | 2,4,6-Trimethylbenzoyl-diphenyl-phosphine oxide | — | — | — |
|  | 2,4-Diethylthioxanthone | — | — | — |
| Colorant | Cyan pigment dispersion | 5 | 5 | 5 |
| Critical load ($W_1$) (g) |  | 4.7 | 31.0 | 4.7 |

TABLE 10-1

|  |  | Comparative Examples | | | |
|---|---|---|---|---|---|
|  |  | 19 | 20 | 21 | 22 |
| Monofunctional monomers | Tetrahydrofurfuryl acrylate | — | — | — | — |
|  | Isobornyl acrylate | 50 | 50 | 50 | 50 |
|  | Phenoxyethyl acrylate | — | — | — | — |
|  | N-vinylcaprolactam | — | — | — | — |
|  | 1-Adamantyl acrylate | 30 | 30 | 30 | 30 |
|  | Isooctyl acrylate | — | — | — | — |
|  | Acryloyl morpholine | 10 | 10 | 10 | 10 |
|  | Stearyl acrylate | — | — | — | — |
|  | Ethyl acrylate | 10 | 10 | 10 | 10 |
| Multifunctional monomers | 1,6-Hexanediol diacrylate | — | — | — | — |
|  | 1,3-Butylene glycol diacrylate | — | — | — | — |
| Oligomers | Urethane methacrylate (weight average molecular weight: 6,500) | — | — | — | — |
|  | Ethoxylated bisphenol A diacrylate (weight average molecular weight: 1,216) | — | — | — | — |
|  | Urethane acrylate (weight average molecular weight: 2,700) | — | — | — | — |
|  | Ester-based urethane acrylate (weight average molecular weight: 4,500) | — | — | — | — |
|  | Polyethylene glycol #400 dimethacrylate (weight average molecular weight: 536) | — | — | — | — |
|  | Composite urethane acrylate (weight average molecular weight: 8,500) | — | — | — | — |
|  | Polyester-based urethane acrylate oligomer (weight average molecular weight: 5,000) | — | — | — | — |
| Resins | Resin 1 (weight average molecular weight: 6,500) | — | — | — | — |
|  | Resin 2 (weight average molecular weight: 10,900) | — | — | — | — |
|  | Resin 3 (weight average molecular weight: 16,000) | — | — | — | — |
|  | Resin 4 (weight average molecular weight: 25,000) | — | — | — | — |
|  | Resin 5 (weight average molecular weight: 5,000) | — | — | — | — |
|  | Resin 6 (weight average molecular weight: 35,000) | — | — | — | — |
|  | Resin 7 (weight average molecular weight: 40,000) | — | — | — | — |
|  | Resin 8 (weight average molecular weight: 40,000) | — | — | — | — |
|  | Resin 9 (weight average molecular weight: 27,600) | — | — | — | — |
| Silica particles | Silica particles 1 (average primary particle diameter: 70 nm) | — | — | — | — |
|  | Silica particles 2 (average primary particle diameter: 50 nm) | — | — | 0.3 | 4.0 |
|  | Silica particles 3 (average primary particle diameter: 30 nm) | — | — | — | — |
|  | Silica particles 4 (average primary particle diameter: 10 nm) | 1.5 | — | — | — |
|  | Silica particles 5 (average primary particle diameter: 100 nm) | — | 1.5 | — | — |

TABLE 10-1-continued

| | | Comparative Examples | | | |
|---|---|---|---|---|---|
| | | 19 | 20 | 21 | 22 |
| Polymerization initiators | Hydroxy-cyclohexyl-phenyl-ketone | 7.5 | 7.5 | 7.5 | 7.5 |
| | 2-Hydroxy-1-{4-[4-(2-hydroxy-2-methyl-propionyl)-benzyl]phehyl}-2-methyl-propan-1-one | — | — | — | — |
| | 2,4,6-Trimethylbenzoyl-diphenyl-phosphine oxide | — | — | — | — |
| | 2,4-Diethylthioxanthone | — | — | — | — |
| Colorant | Cyan pigment dispersion | 5 | 5 | 5 | 5 |
| Critical load ($W_1$) (g) | | 4.0 | 25.1 | 2.6 | 26.6 |

TABLE 10-2

| | | Comparative Examples | | |
|---|---|---|---|---|
| | | 23 | 24 | 25 |
| Monofunctional monomers | Tetrahydrofurfuryl acrylate | 100 | 100 | 100 |
| | Isobornyl acrylate | — | — | — |
| | Phenoxyethyl acrylate | — | — | — |
| | N-vinylcaprolactam | — | — | — |
| | 1-Adamantyl acrylate | — | — | — |
| | Isooctyl acrylate | — | — | — |
| | Acryloyl morpholine | — | — | — |
| | Stearyl acrylate | — | — | — |
| | Ethyl acrylate | — | — | — |
| Multifunctional monomers | 1,6-Hexanediol diacrylate | — | — | — |
| | 1,3-Butylene glycol diacrylate | 20 | — | — |
| Oligomers | Urethane methacrylate (weight average molecular weight: 6,500) | — | — | — |
| | Ethoxylated bisphenol A diacrylate (weight average molecular weight: 1,216) | — | — | — |
| | Urethane acrylate (weight average molecular weight: 2,700) | — | — | — |
| | Ester-based urethane acrylate (weight average molecular weight: 4,500) | — | — | — |
| | Polyethylene glycol #400 dimethacrylate (weight average molecular weight: 536) | — | — | — |
| | Composite urethane acrylate (weight average molecular weight: 8,500) | — | — | — |
| | Polyester-based urethane acrylate oligomer (weight average molecular weight: 5,000) | 5 | — | — |
| Resins | Resin 1 (weight average molecular weight: 6,500) | — | — | — |
| | Resin 2 (weight average molecular weight: 10,900) | — | — | — |
| | Resin 3 (weight average molecular weight: 16,000) | — | — | — |
| | Resin 4 (weight average molecular weight: 25,000) | — | — | — |
| | Resin 5 (weight average molecular weight: 5,000) | — | — | — |
| | Resin 6 (weight average molecular weight: 35,000) | — | — | — |
| | Resin 7 (weight average molecular weight: 40,000) | 5 | — | — |
| | Resin 8 (weight average molecular weight: 40,000) | — | 5 | — |
| | Resin 9 (weight average molecular weight: 27,600) | — | — | 2 |
| Silica particles | Silica particles 1 (average primary particle diameter: 70 nm) | — | — | — |
| | Silica particles 2 (average primary particle diameter: 50 nm) | — | — | — |
| | Silica particles 3 (average primary particle diameter: 30 nm) | — | — | — |
| | Silica particles 4 (average primary particle diameter: 10 nm) | — | — | — |
| | Silica particles 5 (average primary particle diameter: 100 nm) | — | — | — |
| Polymerization initiators | Hydroxy-cyclohexyl-phenyl-ketone | 2.5 | 7.5 | 7.5 |
| | 2-Hydroxy-1-{4-[4-(2-hydroxy-2-methyl-propionyl)-benzyl]phenyl}-2-methyl-propan-1-one | 5 | — | — |
| | 2,4,6-Trimethylbenzoyl-diphenyl-phosphine oxide | — | 10 | 5 |
| | 2,4-Diethylthioxanthone | — | 2 | 2 |
| Colorant | Cyan pigment dispersion | 5 | — | — |
| Critical load ($W_1$) (g) | | 50.0 or more | 50.0 or more | 50.0 or more |

The prepared active-energy-ray-curable compositions of Examples 1 to 34 and Comparative Examples 1 to 25 were evaluated for "rubfastness" and "drawability" in the following manners. Evaluation results are presented in Table 11 and Table 12.

<Rubfastness>

-Preparation of Cured Material-

The active-energy-ray-curable composition was coated on a slide glass (available from Artec Co., Ltd., 008534, 26 mm×76 mm, average thickness: 1 mm or more but 1.2 mm or less) so that a cured material to be obtained would have an average thickness of 10 μm. Immediately after the coating, ultraviolet rays having illuminance of 1.5 W/cm² and an amount of irradiation of 200 mJ/cm² were emitted using an UV irradiator LH6 (available from Fusion Systems Japan) to obtain a cured material having an average thickness of 10 μm. Here, as a method for measuring the average thickness, the average thickness was determined by measuring the cured material for a thickness using an electronic micrometer (available from ANRITSU CORPORATION) and averaging 10 thicknesses measured at 10 sites.

A color fastness rubbing tester (available from TESTER SANGYO CO., LTD.) was used to perform a friction test 200 times on the cured material on the slide glass under application of a load: 500 g based on the rubfastness test described in the JIS K5701-1:2000. A surface condition of the cured material was observed and was evaluated for "rubfastness" based on the following evaluation criteria.
-Evaluation Criteria-
A: No scratch is found.
B: A scratch is found depending on the observation angle.
C: A shallow scratch is found from all the angles.
D: A slide glass is exposed.
<Drawability>

The active-energy-ray-curable composition was ejected on a polycarbonate film (available from Mitsubishi Engineering-Plastics Corporation, product name: IUPILON 100FE2000 masking, average thickness: 100 μm) using an inkjet ejecting apparatus equipped with a GEN4 head (available from RICOH Company, Ltd.) so that a cured film to be obtained would have an average thickness of 10 μm. Immediately after the ejection, ultraviolet rays having an amount of irradiation of 1,500 mJ/cm² were emitted using an UV irradiator LH6 (available from Fusion Systems Japan) to obtain a cured material. Here, as a method for measuring the average thickness, the average thickness was determined by measuring the cured material for a thickness using an electronic micrometer (available from ANRITSU CORPORATION) and averaging 10 film thicknesses.

The obtained cured material was subjected to a heat-drawing test under the following conditions and was measured for a length before the tensile test and a length after the tensile test to determine a drawing rate based on the following formula. Here, the length after the tensile test was defined as a point at which a break of the film first occurred.

Drawing rate (%)=[(length after tensile test−length before tensile test)/(length before tensile test)]×100

—Measurement Conditions—
Tension tester: AUTOGRAPH AGS-5kNX (available from SHIMADZU CORPORATION)
Tension rate: 20 mm/min
Temperature: 180° C.
Sample: JIS K6251 dumbbell-shaped (No. 6)
-Evaluation Criteria-
A: Drawing rate is 700% or more.
B: Drawing rate is 600% or more but less than 700%.
C: Drawing rate is 500% or more but less than 600%.
D: Drawing rate is less than 500%.

TABLE 11

|  |  | Critical load | Evaluation criteria | |
|---|---|---|---|---|
|  |  | ($W_1$) (g) | Rubfastness | Drawability |
| Examples | 1 | 5.2 | C | A |
|  | 2 | 12.3 | B | B |
|  | 3 | 14.4 | B | B |
|  | 4 | 17.3 | A | B |
|  | 5 | 22.3 | A | C |
|  | 6 | 22.4 | A | C |
|  | 7 | 8.4 | C | A |
|  | 8 | 14.2 | B | B |
|  | 9 | 14.8 | B | B |
|  | 10 | 18.9 | A | B |

TABLE 11-continued

| | Critical load | Evaluation criteria | |
|---|---|---|---|
| | ($W_1$) (g) | Rubfastness | Drawability |
| 11 | 24.9 | A | C |
| 12 | 5.4 | C | A |
| 13 | 11.1 | B | B |
| 14 | 13.6 | B | B |
| 15 | 16.1 | A | B |
| 16 | 23.9 | A | C |
| 17 | 5.6 | C | A |
| 18 | 5.0 | C | A |
| 19 | 10.1 | B | B |
| 20 | 13.6 | B | B |
| 21 | 15.2 | A | B |
| 22 | 21.0 | A | C |
| 23 | 9.7 | C | A |
| 24 | 14.5 | B | B |
| 25 | 19.1 | A | B |
| 26 | 24.4 | A | C |
| 27 | 12.2 | B | B |
| 28 | 19.4 | A | B |
| 29 | 5.6 | C | A |
| 30 | 11.7 | B | B |
| 31 | 15.3 | A | B |
| 32 | 22.3 | A | C |
| 33 | 12.6 | B | B |
| 34 | 21.3 | A | B |

TABLE 12

|  |  | Critical load | Evaluation criteria | |
|---|---|---|---|---|
|  |  | ($W_1$) (g) | Rubfastness | Drawability |
| Comparative | 1 | 50.0 or more | A | D |
| Examples | 2 | 3.6 | D | A |
|  | 3 | 25.3 | A | D |
|  | 4 | 0.5 | D | A |
|  | 5 | 3.3 | D | A |
|  | 6 | 3.2 | D | A |
|  | 7 | 30.3 | A | D |
|  | 8 | 4.8 | D | A |
|  | 9 | 28.0 | A | D |
|  | 10 | 0.6 | D | A |
|  | 11 | 27.4 | A | D |
|  | 12 | 3.7 | D | A |
|  | 13 | 26.1 | A | D |
|  | 14 | 2.8 | D | A |
|  | 15 | 30.6 | A | D |
|  | 16 | 4.7 | D | A |
|  | 17 | 31.0 | A | D |
|  | 18 | 4.7 | D | A |
|  | 19 | 4.0 | D | A |
|  | 20 | 25.1 | A | D |
|  | 21 | 2.6 | D | A |
|  | 22 | 26.6 | A | D |
|  | 23 | 50.0 or more | A | D |
|  | 24 | 50.0 or more | A | D |
|  | 25 | 50.0 or more | A | D |

Aspects of the present disclosure are as follows, for example.
<1> An active-energy-ray-curable composition,
wherein a cured material of the active-energy-ray-curable composition satisfies a critical load of 5.0 g or more but 25.0 g or less, the critical load being obtained by a continuous loading test method using a variable normal load friction and wear measurement device, the cured material having an average thickness of 10 μm and being formed by coating the active-energy-ray-curable composition on a substrate and by irradiating and curing the active-energy-ray-curable composition with active energy rays having illuminance of 1.5 W/cm² and an amount of irradiation of 200 mJ/cm².

<2> The active-energy-ray-curable composition according to <1>, further including a monofunctional monomer including one ethylenically-unsaturated double bond and a polymerization initiator.

<3> The active-energy-ray-curable composition according to <2>, wherein the polymerization initiator includes an α-hydroxyacetophenone polymerization initiator.

<4> The active-energy-ray-curable composition according to <3>, wherein the α-hydroxyacetophenone polymerization initiator includes 2-hydroxy-1-{4-[4-(2-hydroxy-2-methyl-propionyl)-benzyl]phenyl}-2-methyl-propan-1-one.

<5> The active-energy-ray-curable composition according to any one of <2> to <4>, wherein an amount of the monofunctional monomer including one ethylenically-unsaturated double bond is 50% by mass or more but 100% by mass or less.

<6> The active-energy-ray-curable composition according to any one of <1> to <5>, further including a resin.

<7> The active-energy-ray-curable composition according to <6>, wherein a weight average molecular weight of the resin is 10,000 or more but 20,000 or less.

<8> The active-energy-ray-curable composition according to <6> or <7>, wherein an amount of the resin is 3% by mass or more.

<9> The active-energy-ray-curable composition according to any one of <1> to <8>, further including an oligomer including an ethylenically-unsaturated double bond.

<10> The active-energy-ray-curable composition according to <9>, wherein an amount of the oligomer including an ethylenically-unsaturated double bond is 10% by mass or less.

<11> The active-energy-ray-curable composition according to <9> or <10>, wherein a weight average molecular weight of the oligomer including an ethylenically-unsaturated double bond is 2,000 or more but 5,000 or less.

<12> The active-energy-ray-curable composition according to any one of <1> to <11>, further including silica particles.

<13> The active-energy-ray-curable composition according to <12>, wherein an average primary particle diameter of the silica particles is 40 nm or more but 60 nm or less.

<14> The active-energy-ray-curable composition according to any one of <1> to <13>, wherein the critical load is 10.0 g or more but 20.0 g or less.

<15> The active-energy-ray-curable composition according to any one of <1> to <14>, wherein a viscosity of the active-energy-ray-curable composition at 25° C. is 3 mPa·s or more but 40 mPa·s or less.

<16> The active-energy-ray-curable composition according to any one of <1> to <15>, wherein the active energy rays include ultraviolet rays.

<17> An active-energy-ray-curable ink including the active-energy-ray-curable composition according to any one of <1> to <16>.

<18> A two-dimensional or three-dimensional image forming method including irradiating the active-energy-ray-curable composition according to any one of <1> to <16> with active energy rays.

<19> A two-dimensional or three-dimensional image forming apparatus including an irradiator configured to irradiate the active-energy-ray-curable composition according to any one of <1> to <16> with active energy rays.

<20> A cured material including:
a substrate; and
a cured film on the substrate,
wherein the cured film is obtained by irradiating and curing the
active-energy-ray-curable composition according to any one of <1> to <16> with active energy rays.

The active-energy-ray-curable composition according to any one of <1> to <16>, the active-energy-ray-curable ink according to <17>, the two-dimensional or three-dimensional image forming method according to <18>, the two-dimensional or three-dimensional image forming apparatus according to <19>, and the cured material according to <20> can solve the various problems in the related art and can achieve the object of the present disclosure.

What is claimed is:

1. An active-energy-ray-curable composition, comprising:
one or more curable monomers;
at least one selected from the group consisting of:
  a multifunctional monomer,
  an oligomer including an ethylenically-unsaturated double bond,
  a resin, and
  silica particles; and
a polymerization initiator;
wherein a cured material of the active-energy-ray-curable composition satisfies a critical load $W_1$ of 5.0 g or more but 25.0 g or less, the critical load $W_1$ being obtained by a continuous loading test method using a variable normal load friction and wear measurement device, the cured material having an average thickness of 10 μm and being formed by coating the active-energy-ray-curable composition on a substrate and by irradiating and curing the active-energy-ray-curable composition with active energy rays having illuminance of 1.5 W/cm$^2$ and an amount of irradiation of 200 mJ/cm$^2$.

2. The active-energy-ray-curable composition according to claim 1, further comprising a polymerization initiator.

3. The active-energy-ray-curable composition according to claim 2, wherein the polymerization initiator includes an a-hydroxyacetophenone polymerization initiator.

4. The active-energy-ray-curable composition according to claim 3, wherein the α-hydroxyacetophenone polymerization initiator includes 2-hydroxy-1-{4-[4-(2-hydroxy-2-methyl-propionyl)-benzyl]phenyl}-2-methyl-propan-1-one.

5. The active-energy-ray-curable composition according to claim 2,
wherein the curable monomer is a monofunctional monomer which is present in an amount of 50% by mass or more but 100% by mass or less.

6. The active-energy-ray-curable composition according to claim 1, comprising the resin.

7. The active-energy-ray-curable composition according to claim 6, wherein the resin has a weight average molecular weight of 10,000 or more but 20,000 or less.

8. The active-energy-ray-curable composition according to claim 6, wherein an amount of the resin is 3% by mass or more.

9. The active-energy-ray-curable composition according to claim 1, comprising the oligomer including an ethylenically-unsaturated double bond.

10. The active-energy-ray-curable composition according to claim 9, wherein a weight average molecular weight of the oligomer including an ethylenically-unsaturated double bond is 2,000 or more but 5,000 or less.

11. The active-energy-ray-curable composition according to claim 9, wherein an amount of the oligomer including an ethylenically-unsaturated double bond is 10% by mass or less.

12. The active-energy-ray-curable composition according to claim 1, comprising the silica particles.

13. The active-energy-ray-curable composition according to claim 12, wherein an average primary particle diameter of the silica particles is 40 nm or more but 60 nm or less.

14. The active-energy-ray-curable composition according to claim 1, wherein the critical load $W_1$ is 10.0 g or more but 20.0 g or less.

15. The active-energy-ray-curable composition according to claim 1, wherein a viscosity of the active-energy-ray-curable composition at 25° C. is 3 mPa·s or more but 40 mPa·s or less.

16. The active-energy-ray-curable composition according to claim 1, wherein the active-energy-ray-curable composition is curable with ultraviolet rays.

17. A two-dimensional or three-dimensional image forming apparatus comprising
an irradiator configured to irradiate the active-energy-ray-curable composition according to claim 1 with active energy rays, and a substrate coated with the active-energy-ray-curable composition.

18. A cured material comprising:
a substrate; and
a cured film on the substrate,
wherein the cured film is obtained by irradiating and curing the active-energy-ray-curable composition according to claim 1 with active energy rays.

19. The active-energy-ray-curable composition according to claim 1, wherein the monofunctional monomer having one ethylenically unsaturated bond is selected from the group consisting of tetrahydrofurfuryl acrylate, isobornyl acrylate, phenoxyethyl acrylate, N-vinylcaprolactam, 1-adamantyl acrylate, isooctyl acrylate, acryloyl morpholine, stearyl acrylate, and an acrylic acid ester.

20. The active-energy-ray-curable composition according to claim 1,
wherein 50% by mass of the curable monomers have one ethylenically unsaturated bond, wherein % by mass is based on the total mass of the curable monomers and the total mass of the active-energy-ray-curable composition;
the oligomer has a weight average molecular weight of 2,000 or more but 5,000 or less,
the resin has a weight average molecular weight of 10,000 or more but 20,000 or less, and
the silica particles have an average primary particle diameter of 40 nm or more but 60 nm or less; and
the active-energy-ray-curable composition further comprises a polymerization initiator.

21. An active-energy-ray-curable ink comprising
an active-energy-ray-curable composition, comprising:
one or more curable monomers;
at least one selected from the group consisting of:
a multifunctional monomer,
an oligomer including an ethylenically-unsaturated double bond,
a resin, and
silica particles; and
a polymerization initiator; and
a colorant;
wherein a cured material of the active-energy-ray-curable composition satisfies a critical load $W_1$ of 5.0 g or more but 25.0 g or less, the critical load being obtained by a continuous loading test method using a variable normal load friction and wear measurement device, the cured material having an average thickness of 10 μm and being formed by coating the active-energy-ray-curable composition on a substrate and by irradiating and curing the active-energy-ray-curable composition with active energy rays having illuminance of 1.5 W/cm$^2$ and an amount of irradiation of 200 mJ/cm$^2$.

22. A two-dimensional or three-dimensional image forming method comprising
coating an active-energy-ray-curable composition onto a substrate,
irradiating the active-energy-ray-curable composition on the substrate with active energy rays to cure the active-energy-ray-curable composition and form the image,
wherein the active-energy-ray-curable composition comprises:
one or more curable monomers;
at least one selected from the group consisting of:
a multifunctional monomer,
an oligomer including an ethylenically-unsaturated double bond,
a resin, and
silica particles; and
a polymerization initiator;
wherein a cured material of the active-energy-ray-curable composition satisfies a critical load $W_1$ of 5.0 g or more but 25.0 g or less, the critical load $W_1$ being obtained by a continuous loading test method using a variable normal load friction and wear measurement device, the cured material having an average thickness of 10 μm and being formed by coating the active-energy-ray-curable composition on a substrate and by irradiating and curing the active-energy-ray-curable composition with active energy rays having illuminance of 1.5 W/cm$^2$ and an amount of irradiation of 200 mJ/cm$^2$.

23. The method according to claim 22, wherein the active-energy-ray-curable composition comprises an α-hydroxyacetophenone polymerization initiator,
the oligomer present in an amount of 10% by mass or less based on 100% by mass of the active-energy-ray-curable composition.

24. The method according to claim 23, wherein the α-hydroxyacetophenone polymerization initiator includes 2-hydroxy-1-{4-[4-(2-hydroxy-2-methyl-propionyl)-benzyl]phenyl}-2-methyl-propan-1-one.

25. The method according to claim 23, wherein the active-energy-ray-curable composition comprises silica particles having an average primary particle diameter of the silica particles is 40 nm or more but 60 nm or less.

26. The method according to claim 22, wherein the polymerization initiator includes an α-hydroxyacetophenone polymerization initiator.

27. The method according to claim 26, wherein the α-hydroxyacetophenone polymerization initiator includes 2-hydroxy-1-{4-[4-(2-hydroxy-2-methyl-propionyl)-benzyl]phenyl}-2-methyl-propan-1-one.

28. The method according to claim 22, comprising the resin.

29. The method according to claim 26, wherein an amount of the resin is 3% by mass or more.

30. The method according to claim 22, comprising the oligomer including an ethylenically-unsaturated double bond.

31. The method according to claim 22, wherein an amount of the oligomer including an ethylenically-unsaturated double bond is 10% by mass or less.

32. The method according to claim 22, comprising the silica particles.

33. The method according to claim 22, wherein the critical load $W_1$ is 10.0 g or more but 20.0 g or less.

34. The method according to claim 22, wherein a viscosity of the active-energy-ray-curable ink at 25° C. is 3 mPa·s or more but 40 mPa·s or less.

35. The method according to claim 22, wherein the active-energy-ray-curable ink is curable with ultraviolet rays.

\* \* \* \* \*